US012099327B2

(12) United States Patent
Parra Pozo et al.

(10) Patent No.: US 12,099,327 B2
(45) Date of Patent: Sep. 24, 2024

(54) HOLOGRAPHIC CALLING FOR ARTIFICIAL REALITY

(71) Applicant: Meta Platforms Technologies, LLC, Menlo Park, CA (US)

(72) Inventors: Albert Parra Pozo, Santa Clara, CA (US); Joseph Virskus, Snoqualmie, WA (US); Ganesh Venkatesh, San Jose, CA (US); Kai Li, Freemont, CA (US); Shen-Chi Chen, Belmont, CA (US); Amit Kumar, Mountain View, CA (US); Rakesh Ranjan, Mountain View, CA (US); Brian Keith Cabral, San Jose, CA (US); Samuel Alan Johnson, Redwood City, CA (US); Wei Ye, Sunnyvale, CA (US); Michael Alexander Snower, San Francisco, CA (US); Yash Patel, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 483 days.

(21) Appl. No.: 17/360,693

(22) Filed: Jun. 28, 2021

(65) Prior Publication Data
US 2022/0413433 A1     Dec. 29, 2022

(51) Int. Cl.
*G03H 1/00*     (2006.01)
*G06N 20/00*     (2019.01)
(Continued)

(52) U.S. Cl.
CPC .......... *G03H 1/0005* (2013.01); *G06N 20/00* (2019.01); *G06T 7/194* (2017.01); *G06T 7/521* (2017.01);
(Continued)

(58) Field of Classification Search
CPC ......... G03H 1/0005; G03H 2001/0088; G03H 2001/0204; H04N 19/597; G06T 7/55;
(Continued)

(56) References Cited

U.S. PATENT DOCUMENTS

| | | | |
|---|---|---|---|
| 6,002,853 A | * | 12/1999 | de Hond ............... G06F 16/954 |
| | | | 709/219 |
| 6,031,573 A | | 2/2000 | MacCormack et al. |

(Continued)

FOREIGN PATENT DOCUMENTS

| | | |
|---|---|---|
| JP | 2011221151 A | 11/2011 |
| WO | 2020117657 A1 | 6/2020 |

(Continued)

OTHER PUBLICATIONS

Gupta K., et al., "Do You See What I See? The Effect of Gaze Tracking on Task Space Remote Collaboration," IEEE Transactions on Visualization and Computer Graphics, Nov. 2016, vol. 22, No. 11, pp. 2413-2422, DOI: 10.1109/TVCG.2016.2593778.

(Continued)

*Primary Examiner* — Nicholas Augustine
(74) *Attorney, Agent, or Firm* — Potomac Law Group PLLC; Dannon Allbee

(57) ABSTRACT

A holographic calling system can capture and encode holographic data at a sender-side of a holographic calling pipeline and decode and present the holographic data as a 3D representation of a sender at a receiver-side of the holographic calling pipeline. The holographic calling pipeline can include stages to capture audio, color images, and depth images; densify the depth images to have a depth value for each pixel while generating parts masks and a body model; use the masks to segment the images into parts needed for hologram generation; convert depth images into a 3D mesh; paint the 3D mesh with color data; perform torso disocclu- (Continued)

sion; perform face reconstruction; and perform audio synchronization. In various implementations, different of these stages can be performed sender-side or receiver side. The holographic calling pipeline also includes sender-side compression, transmission over a communication channel, and receiver-side decompression and hologram output.

20 Claims, 23 Drawing Sheets

(51) Int. Cl.
  *G06T 7/194* (2017.01)
  *G06T 7/521* (2017.01)
  *G06T 7/55* (2017.01)
  *G06T 17/20* (2006.01)
  *G06T 19/00* (2011.01)
  *G06V 40/16* (2022.01)
  *H04M 3/56* (2006.01)
  *H04N 19/597* (2014.01)
  *G03H 1/02* (2006.01)

(52) U.S. Cl.
  CPC ............... *G06T 7/55* (2017.01); *G06T 17/20* (2013.01); *G06T 19/006* (2013.01); *G06V 40/176* (2022.01); *H04M 3/567* (2013.01); *H04M 3/568* (2013.01); *H04N 19/597* (2014.11); *G03H 2001/0088* (2013.01); *G03H 2001/0204* (2013.01); *H04M 2203/359* (2013.01)

(58) Field of Classification Search
  CPC ......... G06T 7/194; G06T 7/521; G06T 17/20; G06T 19/006; G06N 20/00; G06V 40/176; H04M 3/567; H04M 3/568; H04M 2203/359
  See application file for complete search history.

(56) References Cited

U.S. PATENT DOCUMENTS

| | | | | |
|---|---|---|---|---|
| 6,079,982 A * | 6/2000 | Meader | ................... | A63F 13/54 |
| | | | | 434/30 |
| 6,119,147 A * | 9/2000 | Toomey | ................ | G06Q 10/109 |
| | | | | 719/329 |
| 6,179,619 B1 * | 1/2001 | Tanaka | ................... | A63G 7/00 |
| | | | | 472/60 |
| 6,219,045 B1 * | 4/2001 | Leahy | ..................... | H04L 67/10 |
| | | | | 709/204 |
| 6,362,817 B1 * | 3/2002 | Powers | ................. | G06T 17/00 |
| | | | | 345/428 |
| 6,396,522 B1 * | 5/2002 | Vu | ..................... | G06F 3/04845 |
| | | | | 715/848 |
| 6,414,679 B1 * | 7/2002 | Miodonski | ............ | G06T 13/00 |
| | | | | 707/999.005 |
| 6,570,563 B1 * | 5/2003 | Honda | .................. | A63F 13/352 |
| | | | | 345/473 |
| 6,573,903 B2 * | 6/2003 | Gantt | ...................... | G06F 30/00 |
| | | | | 345/619 |
| 6,784,901 B1 * | 8/2004 | Harvey | .................. | H04L 67/02 |
| | | | | 715/848 |
| 6,961,055 B2 * | 11/2005 | Doak | ..................... | A63F 13/63 |
| | | | | 345/677 |
| 7,119,819 B1 * | 10/2006 | Robertson | ........... | G06F 3/04815 |
| | | | | 715/848 |
| 7,414,629 B2 * | 8/2008 | Santodomingo | ........ | G06T 17/05 |
| | | | | 345/582 |
| 7,542,040 B2 * | 6/2009 | Templeman | ............ | G06T 13/40 |
| | | | | 345/474 |
| 7,663,625 B2 * | 2/2010 | Chartier | ................ | G06T 19/20 |
| | | | | 700/182 |
| 7,746,343 B1 * | 6/2010 | Charaniya | ................ | G06N 7/01 |
| | | | | 345/428 |
| 7,788,323 B2 * | 8/2010 | Greenstein | ............ | G06Q 10/10 |
| | | | | 715/744 |
| 7,804,507 B2 * | 9/2010 | Yang | ..................... | H04N 13/344 |
| | | | | 345/633 |
| 7,814,429 B2 * | 10/2010 | Buffet | ..................... | G06F 30/00 |
| | | | | 715/763 |
| 7,817,150 B2 * | 10/2010 | Reichard | ................. | G06T 15/20 |
| | | | | 715/705 |
| 7,844,724 B2 * | 11/2010 | Van Wie | ............... | H04L 67/131 |
| | | | | 709/227 |
| 9,244,533 B2 * | 1/2016 | Friend | .................. | G09B 21/009 |
| 9,244,588 B2 | 1/2016 | Begosa et al. | | |
| 9,303,982 B1 | 4/2016 | Ivanchenko et al. | | |
| 9,696,795 B2 * | 7/2017 | Marcolina | ............... | G06T 17/10 |
| 9,841,814 B1 | 12/2017 | Kallmeyer et al. | | |
| 9,959,676 B2 | 5/2018 | Barzuza et al. | | |
| 9,996,797 B1 * | 6/2018 | Holz | ................... | G06F 3/04842 |
| 10,298,587 B2 | 5/2019 | Hook et al. | | |
| 10,499,033 B2 | 12/2019 | Pesonen | | |
| 10,516,853 B1 * | 12/2019 | Gibson | ................. | H04N 7/157 |
| 10,554,931 B1 | 2/2020 | Zavesky et al. | | |
| 10,582,191 B1 | 3/2020 | Marchak, Jr. et al. | | |
| 10,657,716 B2 | 5/2020 | Clausen et al. | | |
| 10,952,006 B1 | 3/2021 | Krol et al. | | |
| 11,055,514 B1 | 7/2021 | Cao et al. | | |
| 11,138,780 B2 | 10/2021 | Lee | | |
| 11,140,361 B1 | 10/2021 | Krol et al. | | |
| 11,803,065 B1 | 10/2023 | Abou Shousha et al. | | |
| 2001/0018667 A1 * | 8/2001 | Kim | ................... | G06Q 30/0277 |
| | | | | 705/14.73 |
| 2002/0113820 A1 * | 8/2002 | Robinson | .............. | G06F 16/954 |
| | | | | 715/764 |
| 2002/0158873 A1 | 10/2002 | Williamson | | |
| 2003/0037109 A1 | 2/2003 | Newman et al. | | |
| 2004/0113887 A1 * | 6/2004 | Pair | ......................... | G09B 25/08 |
| | | | | 345/156 |
| 2004/0193441 A1 * | 9/2004 | Altieri | ................... | A63F 13/216 |
| | | | | 709/203 |
| 2005/0093719 A1 * | 5/2005 | Okamoto | ........... | G01C 21/3697 |
| | | | | 705/14.62 |
| 2005/0128212 A1 * | 6/2005 | Edecker | .................. | G06T 17/05 |
| | | | | 345/581 |
| 2008/0012936 A1 | 1/2008 | White | | |
| 2008/0030429 A1 * | 2/2008 | Hailpern | ................ | G06T 7/73 |
| | | | | 345/8 |
| 2008/0125218 A1 * | 5/2008 | Collins | .................. | G06Q 90/00 |
| | | | | 463/31 |
| 2008/0246693 A1 * | 10/2008 | Hailpern | ................. | G06T 7/246 |
| | | | | 345/8 |
| 2009/0076791 A1 * | 3/2009 | Rhoades | ................ | A63F 13/53 |
| | | | | 703/21 |
| 2009/0091583 A1 * | 4/2009 | McCoy | ................. | G06T 19/006 |
| | | | | 345/419 |
| 2009/0287728 A1 * | 11/2009 | Martine | ................ | G06Q 30/02 |
| | | | | 715/810 |
| 2009/0300528 A1 * | 12/2009 | Stambaugh | ......... | G06F 3/04817 |
| | | | | 715/764 |
| 2010/0070378 A1 * | 3/2010 | Trotman | ................ | G06Q 30/02 |
| | | | | 705/26.1 |
| 2010/0115428 A1 * | 5/2010 | Shuping | ................ | G06F 3/0481 |
| | | | | 715/277 |
| 2010/0205541 A1 * | 8/2010 | Rapaport | ................ | G06Q 30/02 |
| | | | | 715/753 |
| 2010/0214284 A1 * | 8/2010 | Rieffel | ................... | G06T 17/00 |
| | | | | 382/154 |
| 2010/0274567 A1 * | 10/2010 | Carlson | ................. | G06Q 40/02 |
| | | | | 235/487 |
| 2010/0274627 A1 * | 10/2010 | Carlson | ................. | G06Q 20/20 |
| | | | | 705/16 |
| 2011/0010636 A1 * | 1/2011 | Hamilton, II | .......... | G06Q 10/10 |
| | | | | 705/26.7 |
| 2011/0041083 A1 * | 2/2011 | Gabai | .................... | G06Q 10/00 |
| | | | | 715/753 |
| 2011/0107270 A1 | 5/2011 | Wang et al. | | |
| 2012/0131478 A1 | 5/2012 | Maor et al. | | |

(56) References Cited

U.S. PATENT DOCUMENTS

| | | | |
|---|---|---|---|
| 2012/0249741 A1* | 10/2012 | Maciocci | G06T 19/006 348/51 |
| 2013/0042296 A1* | 2/2013 | Hastings | G06Q 50/184 726/1 |
| 2013/0147911 A1* | 6/2013 | Karsch | H04N 13/261 348/43 |
| 2013/0174213 A1* | 7/2013 | Liu | G06F 21/6245 726/1 |
| 2013/0187910 A1* | 7/2013 | Raymond | H04N 13/305 345/419 |
| 2014/0082526 A1* | 3/2014 | Park | H04L 65/403 715/757 |
| 2014/0282105 A1* | 9/2014 | Nordstrom | G06F 3/016 715/753 |
| 2015/0279044 A1 | 10/2015 | Kim et al. | |
| 2015/0317831 A1 | 11/2015 | Ebstyne et al. | |
| 2015/0317832 A1 | 11/2015 | Ebstyne et al. | |
| 2016/0093113 A1 | 3/2016 | Liu et al. | |
| 2016/0210780 A1 | 7/2016 | Paulovich et al. | |
| 2017/0068551 A1 | 3/2017 | Vadodaria | |
| 2017/0083754 A1 | 3/2017 | Tang et al. | |
| 2017/0169610 A1 | 6/2017 | King | |
| 2017/0185261 A1* | 6/2017 | Perez | G06F 3/04845 |
| 2017/0188002 A1* | 6/2017 | Chan | H04N 13/122 |
| 2017/0243403 A1* | 8/2017 | Daniels | G06T 19/006 |
| 2018/0034867 A1 | 2/2018 | Zahn et al. | |
| 2018/0061121 A1* | 3/2018 | Yeoh | G06T 1/60 |
| 2018/0070115 A1 | 3/2018 | Holmes | |
| 2018/0101989 A1 | 4/2018 | Frueh et al. | |
| 2018/0129278 A1* | 5/2018 | Luchinskiy | G06F 3/0483 |
| 2018/0131907 A1* | 5/2018 | Schmirler | H04N 23/698 |
| 2018/0144212 A1 | 5/2018 | Burgos et al. | |
| 2018/0158246 A1 | 6/2018 | Grau et al. | |
| 2018/0234671 A1 | 8/2018 | Yang et al. | |
| 2018/0239151 A1 | 8/2018 | Chang et al. | |
| 2018/0357472 A1* | 12/2018 | Dreessen | G06V 20/49 |
| 2018/0365882 A1* | 12/2018 | Croxford | G06T 7/70 |
| 2019/0042832 A1 | 2/2019 | Venshtain | |
| 2019/0045157 A1 | 2/2019 | Venshtain et al. | |
| 2019/0045317 A1* | 2/2019 | Badhwar | H04S 7/302 |
| 2019/0058870 A1 | 2/2019 | Rowell et al. | |
| 2019/0087015 A1* | 3/2019 | Lam | A63F 13/213 |
| 2019/0346522 A1 | 11/2019 | Botnar et al. | |
| 2019/0371279 A1 | 12/2019 | Mak | |
| 2020/0090350 A1 | 3/2020 | Cho et al. | |
| 2020/0110928 A1* | 4/2020 | Al Jazaery | G05B 19/042 |
| 2020/0117267 A1* | 4/2020 | Gibson | G06F 3/011 |
| 2020/0117270 A1* | 4/2020 | Gibson | G06F 3/011 |
| 2020/0118342 A1 | 4/2020 | Varshney et al. | |
| 2020/0133618 A1 | 4/2020 | Kim | |
| 2020/0142475 A1 | 5/2020 | Paez et al. | |
| 2020/0279411 A1 | 9/2020 | Atria et al. | |
| 2020/0357158 A1 | 11/2020 | Zhang et al. | |
| 2020/0371665 A1 | 11/2020 | Clausen et al. | |
| 2021/0008413 A1* | 1/2021 | Asikainen | G06F 3/0304 |
| 2021/0019541 A1 | 1/2021 | Wang et al. | |
| 2021/0041951 A1* | 2/2021 | Gibson | G06T 7/74 |
| 2021/0165492 A1 | 6/2021 | Ohashi | |
| 2021/0192852 A1 | 6/2021 | Holmes | |
| 2021/0216039 A1 | 7/2021 | Wenus et al. | |
| 2021/0227178 A1 | 7/2021 | Lyon et al. | |
| 2021/0248727 A1 | 8/2021 | Fisher et al. | |
| 2021/0263593 A1 | 8/2021 | Lacey | |
| 2021/0287430 A1 | 9/2021 | Li et al. | |
| 2021/0358212 A1 | 11/2021 | Vesdapunt et al. | |
| 2021/0365064 A1 | 11/2021 | Liu | |
| 2021/0390767 A1 | 12/2021 | Johnson et al. | |
| 2022/0070232 A1* | 3/2022 | Young | G06T 19/003 |
| 2022/0172424 A1 | 6/2022 | Vircíková et al. | |
| 2022/0197403 A1 | 6/2022 | Hughes et al. | |
| 2022/0205835 A1 | 6/2022 | Burns et al. | |
| 2022/0210349 A1 | 6/2022 | Bong et al. | |
| 2022/0238220 A1 | 7/2022 | Konrad et al. | |
| 2022/0413434 A1 | 12/2022 | Parra Pozo et al. | |
| 2023/0334909 A1 | 10/2023 | Haller et al. | |
| 2023/0367857 A1 | 11/2023 | Haller et al. | |

FOREIGN PATENT DOCUMENTS

| | | |
|---|---|---|
| WO | 2020256969 A1 | 12/2020 |
| WO | 2021062278 A1 | 4/2021 |

OTHER PUBLICATIONS

Unknown., "A Better Way to Meet Online," Gather, https://www.gather.town/ , Last Accessed Oct. 11, 2021.

International Preliminary Report on Patentability for International Application No. PCT/US2021/038992, dated Feb. 2, 2023, 14 pages.

International Search Report and Written Opinion for International Application No. PCT/US2021/038992, dated Oct. 29, 2021, 16 pages.

Yang B., et al., "3D Object Reconstruction from a Single Depth View with Adversarial Learning," Proceedings of the IEEE International Conference on Computer Vision Workshops, 2017, pp. 679-688.

Huynh D., et al., "A Framework for Cost-Effective Communication System for 3D Data Streaming and Real-Time 3D Reconstruction," Interactive and Spatial Computing, Apr. 12, 2018, 9 pages.

International Search Report and Written Opinion for International Application No. PCT/US2023/010369, dated Apr. 28, 2023, 15 pages.

Chen Z., et al., "Estimating Depth from RGB and Sparse Sensing," European Conference on Computer Vision (ECCV) 2018, Apr. 9, 2018, 22 pages.

Croitoru I., et al., "Unsupervised Learning of Foreground Object Segmentation," International Journal of Computer Vision (IJCV), May 13, 2019, vol. 127, No. 9, May 13, 2019, 24 pages.

Frueh C., et al., "Headset removal for virtual and mixed reality," ACMSIGGRAPH Talks, 2017, 2 pages.

International Search Report and Written Opinion for International Application No. PCT/US2022/031497, dated Sep. 29, 2022, 11 pages.

International Search report and Written Opinion for International Application No. PCT/US2022/039453, dated Nov. 29, 2022, 16 pages.

Kuster C., et al., "Towards Next Generation 3D Teleconferencing Systems," 2012 3DTV-Conference: The True Vision—Capture, Transmission, and Display of 3D Video (3DTV-CON), Oct. 15, 2012, pp. 1-4.

Wei S. E., et al., "VR Facial Animation via Multiview Image Translation," ACM Transactions on Graphics (TOG), 2019, vol. 38, No. 4, pp. 1-16.

Wilson A.D., "Fast Lossless Depth Image Compression," Proceedings of the 2017 ACM International Conference on Interactive Surfaces and Spaces, Oct. 17, 2017, pp. 100-105.

International Preliminary Report on Patentability for International Application No. PCT/US2022/031496, mailed Jan. 11, 2024, 9 pages.

International Preliminary Report on Patentability for International Application No. PCT/US2022/031497, mailed Jan. 11, 2024, 9 pages.

International Preliminary Report on Patentability for International Application No. PCT/US2022/039453, mailed Feb. 15, 2024, 15 pages.

International Search Report and Written Opinion for International Application No. PCT/US2022/031496, mailed Sep. 15, 2022, 11 pages.

Khan M.S.L., et al., "Face-Off: A Face Reconstruction Technique for Virtual Reality (VR) Scenarios," European Conference on Computer Vision, Sep. 18, 2016, XP047566031, pp. 490-503.

(56) References Cited

OTHER PUBLICATIONS

Zollhofer M., et al., "State of the Art on Monocular 3D Face Reconstruction, Tracking, and Applications," Computer Graphics Forum (CGF), May 22, 2018, vol. 37, No. 2, pp. 523-550.

* cited by examiner

HOLOGRAPHIC CALLING FOR ARTIFICIAL REALITY

CROSS-REFERENCE TO RELATED APPLICATIONS

This application is related to U.S. patent application Ser. No. 17/360,735, and U.S. patent application Ser. No. 17/360,758, each also titled "Holographic Calling for Artificial Reality," each filed on Jun. 28, 2021, and each is herein incorporated by reference in its entirety.

TECHNICAL FIELD

The present disclosure is directed to capturing and encoding holographic data at a sender-side of a holographic calling pipeline and decoding and presenting the holographic data as a 3D representation of a sender at a receiver-side of the holographic calling pipeline.

BACKGROUND

Video conferencing has become a major way people connect. From work calls to virtual happy hours, webinars to online theater, people feel more connected when they can see other participants, bringing them closer to an in-person experience. However, video calls remain a pale imitation of face-to-face interactions. Understanding body language and context can be difficult with only a two-dimensional ("2D") representation of a sender. Further, interpersonal interactions with video are severely limited as communication often relies on relational movements between participants. With video calling, however, the point of view is fixed to the sender's camera, eliminating the ability of participants to perform relational movements. In addition, the limitation of video calling on a flat panel display introduces an intrusive layer of technology that can distract from communication and diminishes the perception of in-person communication.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
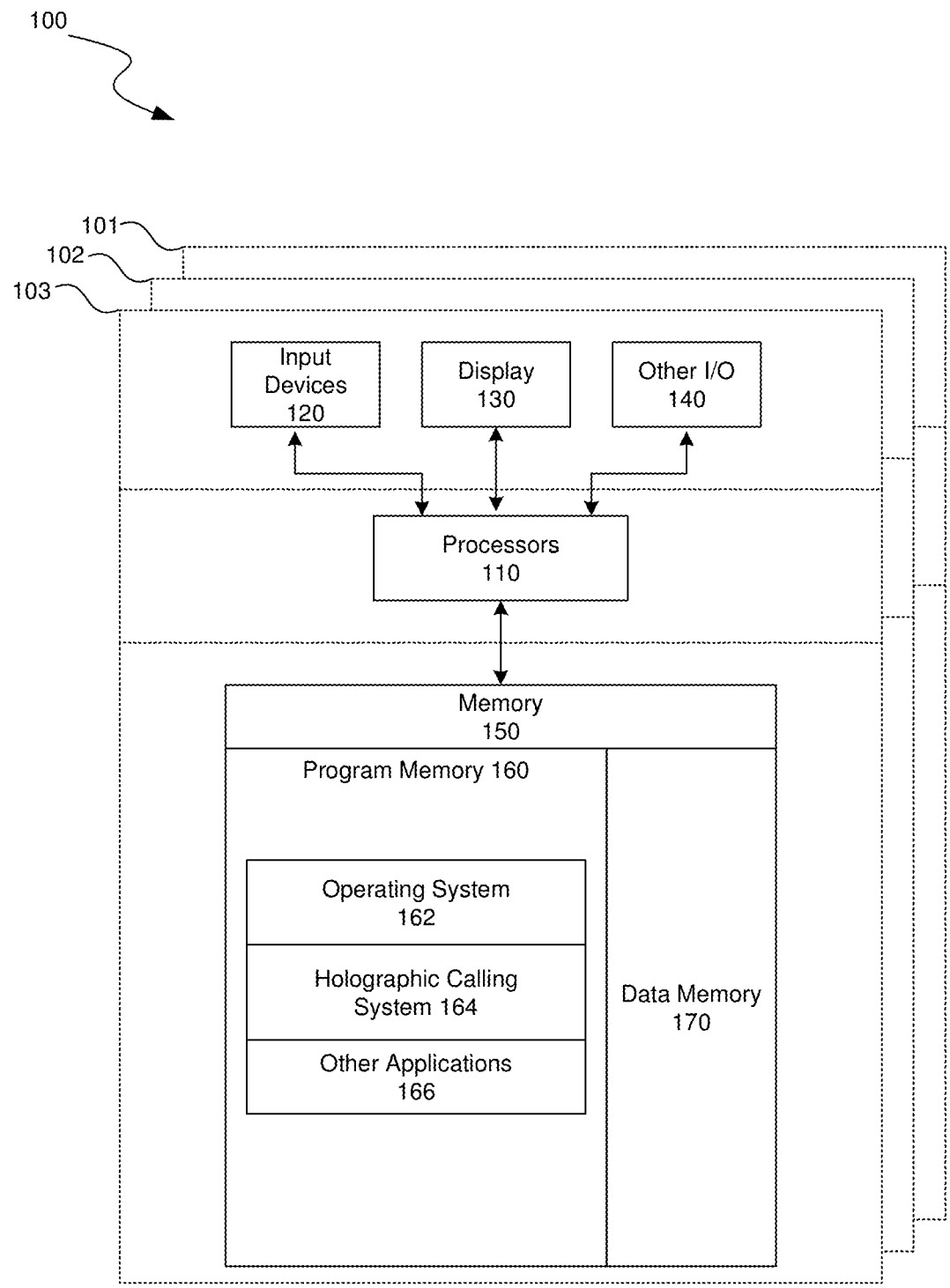
FIG. 1 is a block diagram illustrating an overview of devices on which some implementations of the present technology can operate.

Aspects of the present disclosure are directed to a holographic calling system that captures and encodes holographic data at a sender-side of a holographic calling pipeline (the "pipeline") and decodes and presents the holographic data as a 3D representation of a sender at a receiver-side of the holographic calling pipeline. In some cases, holographic calling in augmented reality allows users to have a conversation, appearing as if they are face-to-face in 3D space. As used herein, a "hologram," "holographic representation," and similar phrases describe a virtual object that appears to a user as if it is in the user's environment. Holograms can be presented in multiple ways, such as through projections into a user's eye or projections into the environment. Depending on the type of hardware used and the processing and network bandwidth available, the holographic calling system can provide varying experiences. For example, the holographic calling system can provide a holographic calls between any combination of artificial reality (XR) devices, mobile devices (e.g., smartphones), traditional computing systems (e.g., a laptop or desktop with a webcam), etc. The experience of each user may depend on the capture and processing capabilities of the sending system and the display and processing capabilities of the receiving system. For example, where one user is using a mobile phone and another is using an XR system, the user of the XR system may see a hologram of the other user in their space while the mobile phone user may see a representation of the other user on their phone screen.

To provide holographic calls, the holographic calling pipeline of the holographic calling system can include stages to capture audio, color images, and depth images; densify the depth images to have a depth value for each pixel while generating parts masks and a body model; use the masks to segment the images into parts needed for hologram generation; convert the depth images into a 3D mesh; paint the 3D mesh with color data; perform torso disocclusion; perform face reconstruction; and perform audio synchronization. In various implementations, different stages of this pipeline can be performed sender-side or receiver side. For example, in various implementations, one or more of the stages for conversion of depth images into a 3D mesh, painting the 3D mesh with color data, performing torso disocclusion, performing face reconstruction, and/or the creation of 3D meshes can be performed sender-side or receiver-side. The holographic calling pipeline also includes sender-side compression, transmission over a communication channel, and receiver-side decompression and hologram output (or other types of output, depending on device capability).

The pipeline stage for capturing audio, color images, and depth images can be performed on the sender-side using a capture devices such as microphones for audio, RGB (or black-and-white) cameras for color images, and depth sensors for depth images. As discussed below, these capture devices can come in a variety of types. These capture devices can be housed in one or more devices such as an XR system or a mobile phone. In some cases, the XR system can include multiple devices, such as a headset and a separate device with a camera able to view at least the upper portion of the sending user. In some implementations, the captured color images can be images from one camera or from multiple cameras, each directed to at least a portion of the sending user. In yet further implementations, the depth images can be point clouds or structured light (e.g., a grid of captured inferred (IR) points which are analyzed for distortion or time of flight readings to precisely identify the distance from the IR source to each point). The captured depth information can be formed into depth images, e.g., as color or grayscale images where the hue or shade of each pixel represents a depth for that pixel. These depth images can be synchronized to the color images, e.g., based on timestamps. Additional details on the capture and image generation stages are provided below in relation to blocks 504 and 506 of FIG. 5A and blocks 704 and 706 of FIG. 7A.

Another pipeline stage can densify the depth images while generating parts masks and a body model. The densification can occur in systems that use structured light or where the captured depth data otherwise does not include a depth value for each pixel in a corresponding color image. The parts masks can be masks that specify which areas in an image show characteristics such as a mask for segmenting the sending user from the background, masks to identify particular body parts, such as the sending user's head, torso, arm segments, hands, etc., and/or masks to identify other depicted aspects such as an XR headset worn by the sending user. The body model, sometimes referred to as a kinematic model, can specify a current body configuration of the sending user, e.g., distances between body points, such as the distance between the wrist and elbow joints, and angles between body parts, such as the angle between the forearm and upper arm or the direction of the head in relation to the shoulders. An example body model is discussed below in relation to FIG. 14. In various implementations, one or more machine learning models can be trained to generate the densified depth images, masks, and body model. In some implementations, this/these model(s) can be trained using synthetic images of people in various environments and characteristics, generated with known depth data, masks, and body positions. Additional details on densification, masking, and body model generation are provided below in relation to block 508 of FIG. 5A, block 708 of FIG. 7A, and FIGS. 11A-11C.

A further pipeline stage can use the generated masks to segment the depth and color images into parts needed for hologram generation, eliminating unnecessary portions and providing labeled image portions. Additional details on applying generated masks are provided below in relation to block 510 of FIG. 5A and block 710 of FIG. 7A.

The pipeline can further include a stage that converts the depth images into a 3D mesh. Because the depth images include depth data for the sending user from at least one perspective, the holographic calling system can create a 3D model of a portion of the sending user from this perspective. In some cases, the holographic calling system can also extrapolate to fill in the 3D mesh from other points of view, e.g., based on previous depth images that captured other portions of the sending user or pre-scans of the sending user from multiple angles, which can be knit together with the current 3D mesh. In some implementations, unknown portions of the 3D mesh can be filled in with corresponding portions of an existing lifelike model, selected based on that model having features similar to those of the sending user. The pipeline can include a stage for taking the created 3D mesh and painting it with color data of the sending user. Additional details on converting depth images into a 3D mesh and painting it are provided below in relation to blocks 558 and 560 of FIG. 5B and blocks 712 and 714 of FIG. 7A.

The pipeline can also include a stage for filling in occlusions in the body portion of the 3D mesh representing the sending user. Referred to herein as torso disocclusion, this can include filling in holes in the body portion with corresponding pieces from an existing model of the sending user. The existing model can be created using either a pre-scan process to get an initial 3D model of the sending user (e.g., at the beginning of a holographic call) or by building up the 3D model from snapshots taken earlier in the call where the body was not occluded. In some cases, later snapshots can be captured to periodically update the existing model of the sending user. These images, together with a corresponding body model, can be used to create a 3D model of the user with meta-data defining labels for particular points (e.g., "vertices") on the body. When the holographic calling system identifies a hole in the 3D mesh, the holographic calling system can use the body model (discussed above) to identify corresponding vertices of the existing model, which it uses to fill in that hole. For example, the depth sensor may capture an image of the user while the user is gesturing with her hands in front of herself. Due to the placement of the user's hands, a portion of the user's torso may not be visible to the depth sensor. Thus, when the 3D mesh is created, there may be a hole in the representation of the sending user behind the user's hands. This can be filled in with the corresponding portion of the existing model of the sending user, created from a snapshot in the where the user's hands did not occlude the user's torso. Additional details on torso disocclusion are provided below in relation to block 562 of FIG. 5B, block 716 of FIG. 7A, and FIG. 10.

Another stage in the pipeline can perform facial reconstruction. Facial reconstruction can remove from the representation of the sending user the XR headset or paint in the user's eyes as seen through lenses of the XR headset. The face reconstruction stage can accomplish this using either or both of a machine learning approach or a heuristic approach. Additional details on face reconstruction are provided below in relation to block 564 of FIG. 5B, block 718 of FIG. 7A, FIGS. 8A and 8B (the machine learning approach) and FIGS. 9A and 9B (the heuristic approach).

The machine learning approach for facial reconstruction can include training a machine learning model to take an image of a user's face including an XR device and provide either an image of the user's face without the XR device or with the lenses of the XR device appearing transparent. In some cases, the model can be trained using training items that are generated by taking, as ground truth, either an image of a user without an XR device or that image augmented with an XR device with the lens portion transparent, and pairing that ground truth image with a generated image showing the XR device added to the user image over the user's eyes, as it would be captured during a call. The machine learning model can include an encoder, a geometry projection branch, and a texture projection branch. During training, the encoder can receive the input image with the XR device and encode it for application to machine learning models. The encoding of the image can be provided to both the geometry projection branch and the texture projection branch. The geometry projection branch can predict a geometry (3D mesh) of the user's face excluding the XR device and the texture projection branch can predict a texture of the user's face. In some implementations, the holographic calling system can compare a geometry generated for the ground truth in the training item with the predicted geometry and can apply a first set of loss functions to update parameters of the geometry projection branch, training it. Similarly in these implementations, the holographic calling system can compare a texture generated for the ground truth in the training item with the predicted texture and can apply a second set of loss functions to update parameters of the texture projection branch, training it also. In other implementations, the predicted texture can be painted onto the predicted geometry and produce and output image; the holographic calling system can compare the ground truth in the training item with the output image and can apply a set of loss functions to update parameters of both the geometry projection branch and the texture projection branch, training the model. Once the model is trained, it can be applied during a holographic call to receive an image of the sending user wearing an XR device and produce either an image of the user without the XR device or with the lenses transparent. Additional details on face reconstruction using the machine learning approach are provided below in relation FIGS. 8A and 8B.

The heuristic approach to face reconstruction can include performing a pre-scan of the sending user's face while that user is not wearing the XR device. This pre-scan can be used to generate a 3D mesh of the user's face, which can further be transformed into multiple meshes for different user expressions. During the holographic call, the holographic calling system can analyze an input image of the user wearing the XR device to determine a head pose and facial expression of the user. The holographic calling system can then select one or more of the expression meshes corresponding to the determined facial expressions and blend them into an output mesh corresponding to the user's current expression. Finally, the holographic calling system can apply live depth data and color data for the sending user to adjust the output mesh to resemble the sending user more closely. The result of this adjustment can be a live reconstruction of the user's face without the XR device or, if the XR device with transparent lenses is desired, the user's face with a model of the XR device with transparent lenses can be added to the output mesh. Additional details on face reconstruction using the heuristic approach are provided below in relation FIGS. 9A and 9B.

Addition stages of the pipeline can include various synchronizations between the color images, the depth images, and captured audio. For example, timestamps associated with captured data can be used to synchronize the various types of data. Additional details on synchronization are provided below in relation blocks 506 and 514 of FIG. 5A, blocks 556 and 566 of FIG. 5B, blocks 706 and 722 of FIG. 7A, and block 756 of FIG. 7B.

The pipeline can also include processes to perform sender-side compression before data is transmitted to the recipient. For example, the pipeline can use RVL, RLE, TRVL or other types of compression. The pipeline can include processes to setup and transmit data over a communication channel (e.g., a real-time communication "RTC" communication channel). The pipeline can include processes to perform receiver-side decompression of data received from the sender over the communication channel. Finally, pipeline can include processes to output received data (e.g., hologram data, image data, and/or audio data).

By employing the above pipeline, the holographic calling system can implement holographic calls between two or more devices. The result can provide users an interactive calling experience where the users experience greater presence with the other conversation participants, as compared to existing communication system such as voice or video calling. For example, users of an XR device in some cases can move around their environment to see the holographic representation of the other user from different angles. In some cases, the user may be able to interact with the holographic representation of the other user, where an application can A) identify when a part of the user touches or indicates a part of the holographic representation of the other user and B) take a corresponding action (e.g., signaling the interaction to the represented user, causing an effect to be applied to the holographic representation of the other user, etc.)

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

While there are existing visual communication systems, they fail to enable communications comparable to in-person interaction. For example, existing video calling systems limit how much body language can be perceived, fail to provide the ability for users to move relative to each other, and introduce an intrusive layer of technology that can distract from the communication and diminish the perception of in-person communication. In addition, existing systems for providing interactions in 3D environments, such as in virtual reality chat rooms, are very computationally expensive and fail to accurately depict the communication participants. The holographic calling system and holographic calling pipeline described herein are expected to overcome these problems associated with conventional video and 3D interaction techniques and are expected to reduce computational requirements of 3D communication while providing more realistic interactions. Furthermore, by including techniques that can be customized depending on the capabilities of the devices used, the holographic calling system can operate with various device types and display systems beyond the capabilities of existing systems. In addition, while the disclosed holographic calling system provides a result comparable to an in-person experience, the processes and systems to achieve this result are not analogs of existing communication techniques, but instead introduce completely new ways of organizing data capture and processing steps, analyzing and densifying captured data for a holographic call, intelligently filling in occlusions and removing devices from user's faces, etc. to provide a holographic calling experience. For example, the existing video calling techniques use capture and compression, but do not incorporate 3D reconstructions, nor do they account for user movement and format data to allow a recipient to view the sending user from a perspective other than that of the capture device. Further, existing 3D interaction systems fail to provide the fidelity and resource conservation offered by the disclosed holographic calling system.

Several implementations are discussed below in more detail in reference to the figures. FIG. 1 is a block diagram illustrating an overview of devices on which some implementations of the disclosed technology can operate. The devices can comprise hardware components of computing systems 100 that capture and encode holographic data at a sender-side of a holographic calling pipeline and decode and present the holographic data as a 3D representation of a sender at a receiver-side of the holographic calling pipeline. In various implementations, computing systems 100 can include a single computing device 103 or multiple computing devices (e.g., computing device 101, computing device 102, and computing device 103) that communicate over wired or wireless channels to distribute processing and share input data. In some implementations, computing systems 100 can include a stand-alone headset capable of providing a computer created or augmented experience for a user without the need for external processing or sensors. In other implementations, computing systems 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing systems 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing systems 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing systems 100 can include a communication device capable of communicating wirelessly or wire-based with other local computing devices or a network node. The communication device can communicate with another device or a server through a network using, for example, TCP/IP protocols. Computing systems 100 can utilize the communication device to distribute operations across multiple network devices.

The processors 110 can have access to a memory 150, which can be contained on one of the computing devices of computing systems 100 or can be distributed across of the multiple computing devices of computing systems 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, holographic calling system 164, and other application programs 166. Memory 150 can also include data memory 170 that can include, for example, captured color, depth, and audio data, densification and masking machine learning models, body modeling algorithms, compression algorithms, real-time communication protocols, 3D meshes, textures, XR device 3D models, facial reconstructions machine learning models and algorithms, configuration data, settings, user options or preferences, etc., which can be provided to the program memory 160 or any element of the computing systems 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
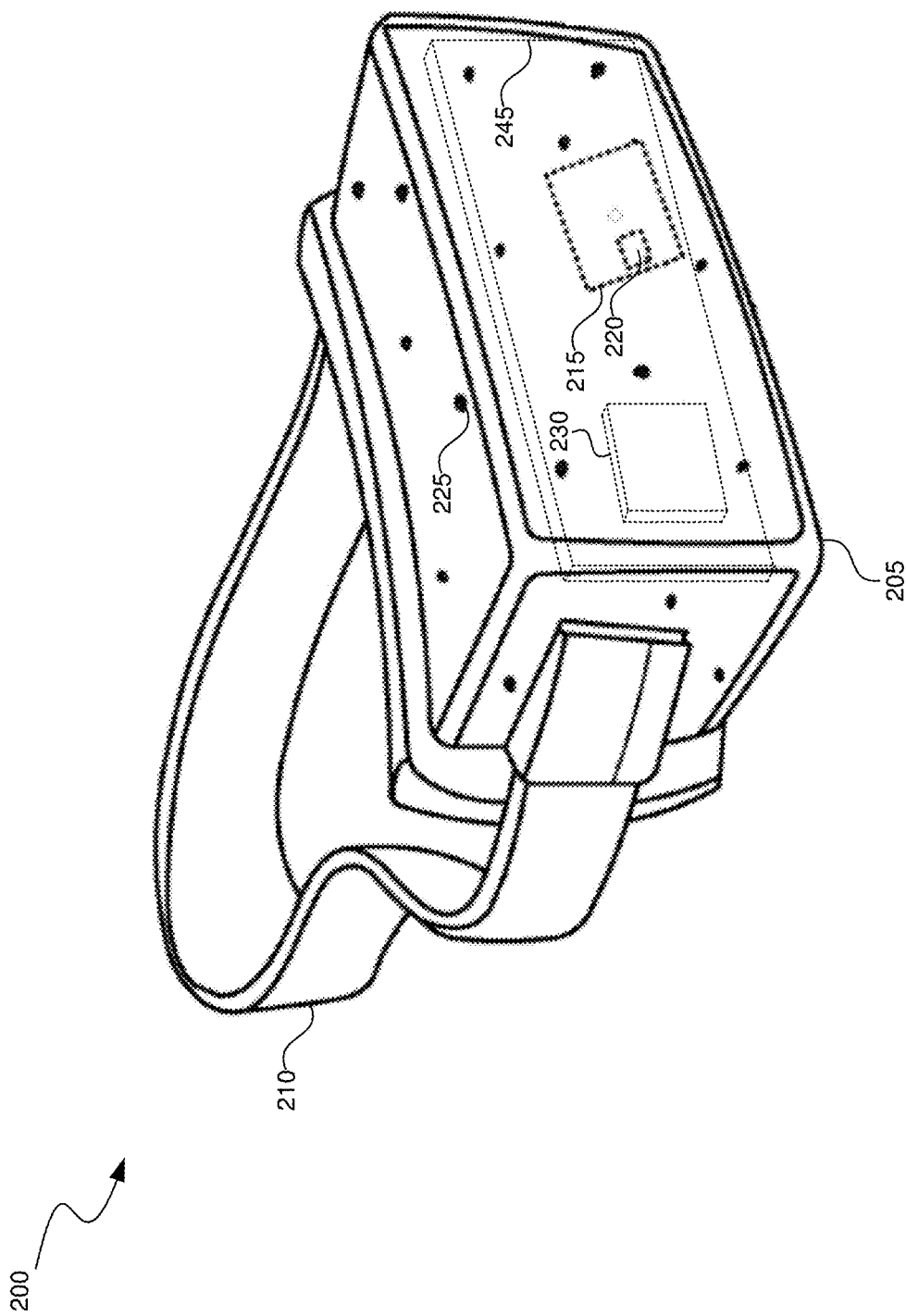
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3 DoF) or six degrees of freedom (6 DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
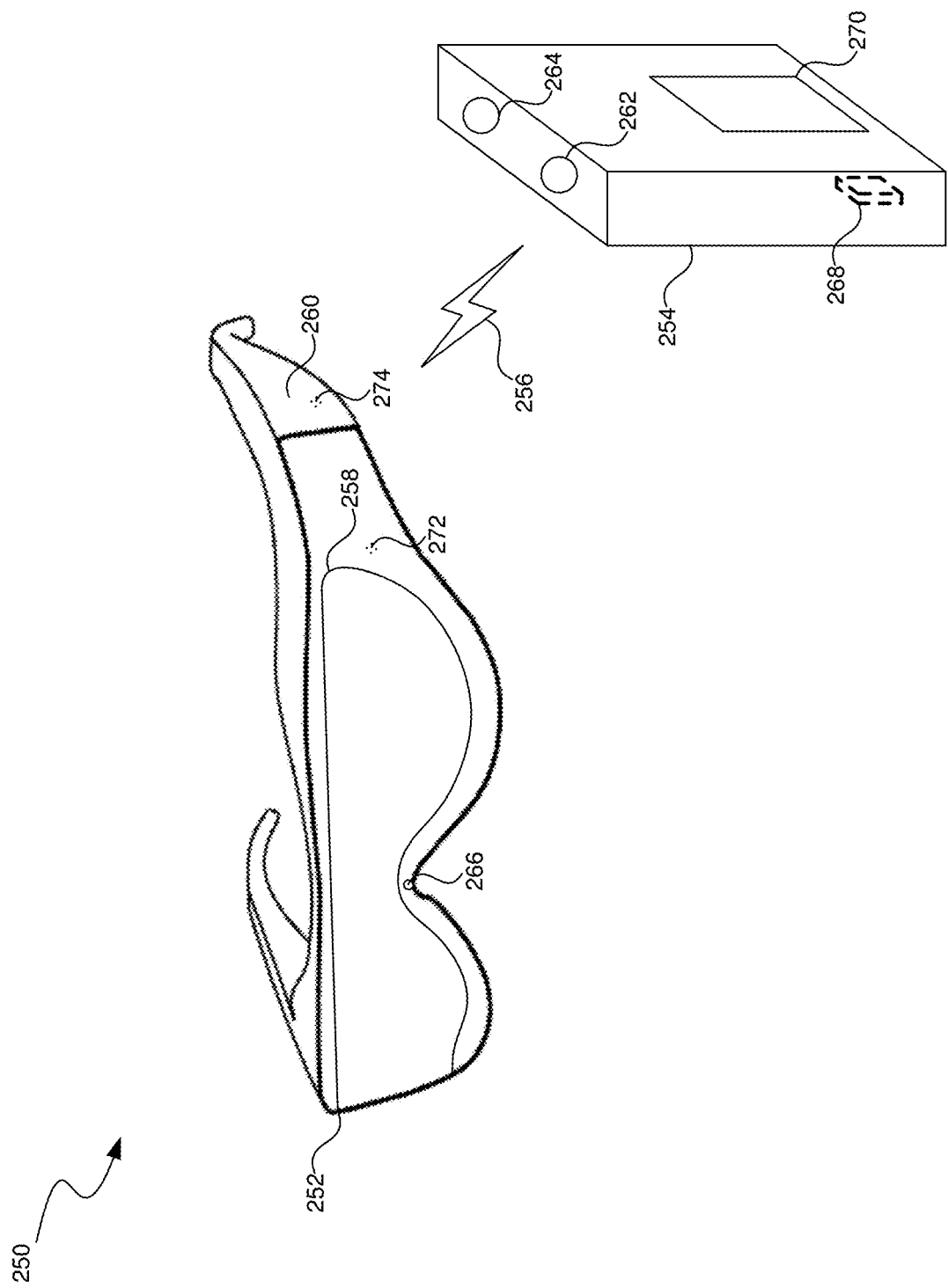
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. In yet further embodiments, primary processing for the mixed reality system HMD system 250 is performed on the mixed reality HMD 252, while component 254 merely provides I/O functionality such as color and depth image capture, user input, network connectivity, or etc. The mixed reality HMD 252 includes a pass-through display 258 and a frame 260. The frame 260 can house various electronic components (some not shown) such as light projectors (e.g., LASERs, LEDs, etc.), cameras, eye-tracking sensors 272, MEMS components, networking components, microphones 266, audio output devices 274, etc. In some implementations, mixed reality HMD system 250 (in either or both of mixed reality HMD 252 and a core processing component 254) can include hardware described above in relation to virtual reality HMD 200, such as IR transmitters and cameras and Simultaneous Localization and Mapping (SLAM) cameras for six-degree-of-freedom position tracking and localization.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects. In some implementations, the core processing component 254 can include additional I/O hardware such as one or more depth sensors 262 (which, for example, may capture structured light, point clouds, or other depth data), RGB and/or black-and-white camera(s) 264, a touchpad or other user input component 270, IMU units and/or magnetometers 268, etc.

Figure 2C:
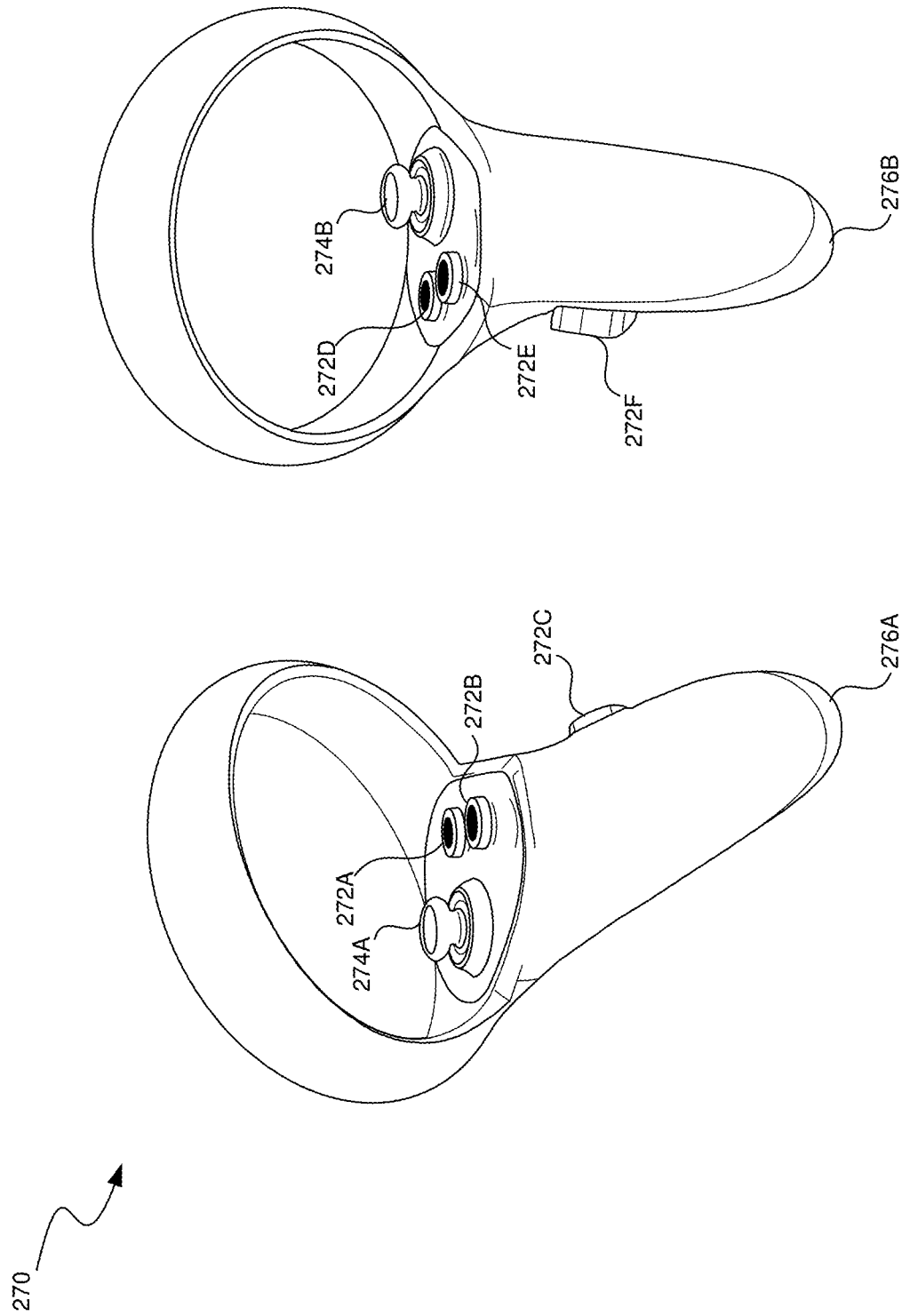
FIG. 2C is a wire diagram illustrating controllers which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3 DoF or 6 DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
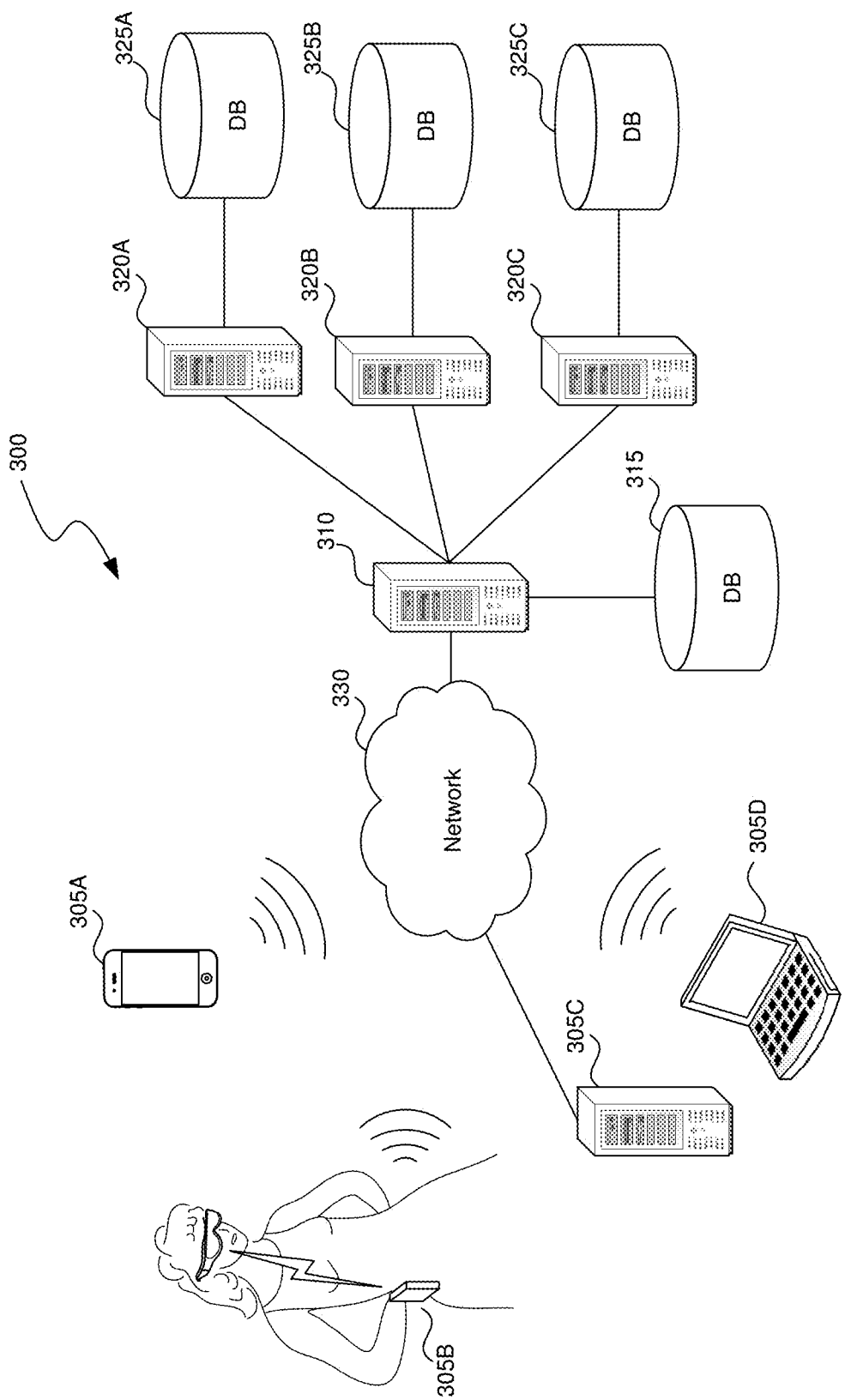
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing systems 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing systems 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
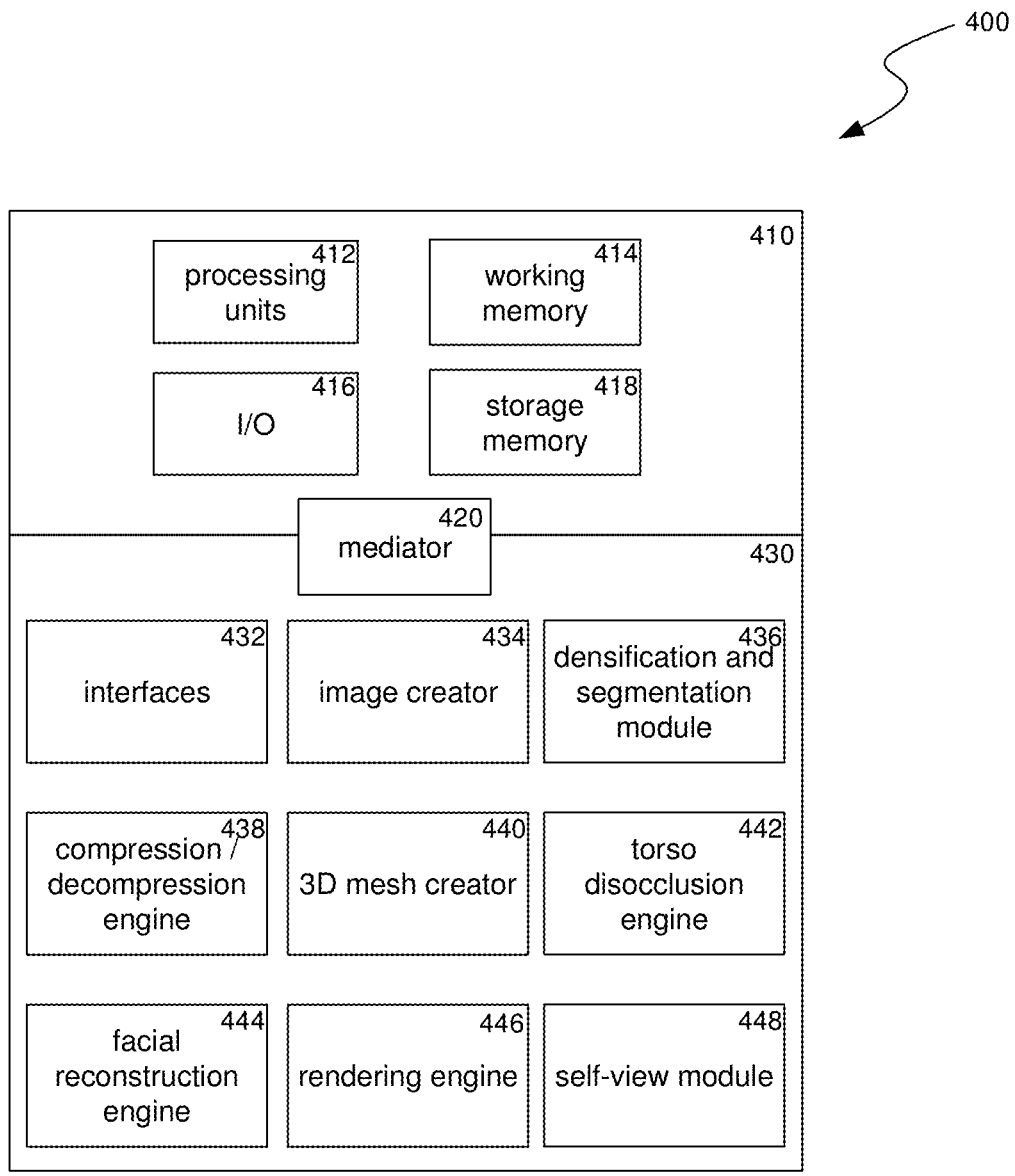
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing systems 100 or can be distributed across multiple of the devices of computing systems 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for a holographic calling pipeline. Specialized components 430 can include image creator 434, densification and segmentation module 436, compression/decompression engine 438, 3D mesh creator 440, torso disocclusion engine 442, facial reconstruction engine 444, rendering engine 446, self-view module 448, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Image creator 434 can receive data flows from I/O devices 416, such as one or more RGB cameras, one or more black-and-white cameras, one or more depth sensors, etc. From these data flows, image creator 434 create color (including black-and-white) images and/or depth images. This can include creating the image data structures, performing denoising, stabilization, color adjustments, sharpening, smoothing, and other enhancements, and resolution up or down scaling. Additional details on image creation are provided below in relation to blocks 504 and 506 of FIG. 5A and blocks 704 and 706 of FIG. 7A.

Densification and segmentation module 436 can receive depth images from image creator 434 (and in some cases also color images) and can perform densification, segmentation, and body modeling. The densification can include defining a depth measurement for each pixel of a depth image. The segmentation can identify portions of an image, such as the foreground (the portion showing a user), portions of a body such as a torso, arms, hands, and head, and a worn XR device. The body modeling can include identifying particular points, in 3D space, matching particular body parts and links between some of these points. In some implementations, densification and segmentation module 436 can perform the densification, segmentation, and body modeling simultaneously be applying a machine learning model trained to perform all three functions. Such a machine learning model can be trained on synthetic images of people in various environments, where the creation of such synthetic images can include labeling each pixel of the image with depth data from a virtual camera at which the perspective of the image is created, labeling portions as foreground/background, body parts, and XR device, and with assigned points and point connections for a body model. Additional details on densification, segmentation, and body modeling are provided below in relation to block 508 of FIG. 5A, block 708 of FIG. 7A, and FIGS. 11A-11C.

Compression/decompression engine 438 can compress color images, depth images, 3D meshes, and/or audio data for transmission to a recipient of a holographic call. Compression/decompression engine 438 can also decompress color images, depth images, 3D meshes, and/or audio data received from a sender in a holographic call. In various implementations, the compression and decompression can be performed using various compression algorithms such as RVL, RLE, TRVL, H.264/5, FLAC, WMAL, and others. Additional details on compression and decompression are provided below in relation to blocks 512 and 514 of FIG. 5A, block 556 of FIG. 5B, blocks 720 and 722 of FIG. 7A, and block 756 of FIG. 7B.

3D mesh creator 440 can receive color and depth images and convert them into a 3D mesh. This can include constructing a 3D mesh with points in 3D space corresponding to the depths defined for the pixels in the depth image, filling in gaps with a generic model of a body, and painting the color images onto the 3D mesh. Additional details on transforming depth and color images into a mesh are provided below in relation to blocks 558 and 560 of FIG. 5B and blocks 712 and 714 of FIG. 7A.

Torso disocclusion engine 442 can identify gaps in a torso portion of a 3D representation of a user and can fill in those gaps with corresponding areas from an existing model of the user. This can include creating the existing model of the user at a previous point from images captured, by the capture device, when portions of the torso were not occluded; matching the gaps in the 3D representation of the user with corresponding portions of the existing model by matching body models for each; and filling the gaps with the matched portions. Additional details on torso disocclusion are provided below in relation to block 562 of FIG. 5B, block 716 of FIG. 7A, and FIG. 10.

Facial reconstruction engine 444 can create a representation of a user's head that either removes an XR headset the user is wearing or makes lenses of the XR headset appear transparent. Facial reconstruction engine 444 can accomplish this by either applying a machine learning model or through a heuristic approach.

The machine learning model can be a model trained on training items with the ground truth being an image of a person's face without an XR device (or with an XR device added but having the lens portions transparent) and the model input for that training item being a version of the ground truth image with an XR headset superimposed over the user's face. Applying the machine learning model can include encoding the model input and providing the encoded image to both a texture prediction branch that predicts a texture for the model input and a geometry prediction branch that predicts a geometry for the model input. The predicted texture can then be skinned onto the predicted geometry. During the training phase, one or more loss functions can be applied based on a comparison of outputs from portions of the model to versions of the ground truth for that training item. Additional details on facial reconstruction by applying a machine learning model are provided below in relation to block 564 of FIG. 5B, block 718 of FIG. 7A, and FIGS. 8A and 8B.

The heuristic approach to facial reconstruction can include generating a pre-scan of a user's face while they are not wearing the XR headset and generating multiple expression meshes based on this pre-scan. During a holographic call, the system can determine a current head position and expression of the sending user and transform a combination of the expression meshes to match the head position and expression. The resulting combination can be blended with live color and depth data for the sending user, which can create a life-like version of the sending user, without the XR headset, that matches the position and expression of the sending user. Additional details on facial reconstruction using a heuristic approach are provided below in relation to block 564 of FIG. 5B, block 718 of FIG. 7A, and FIGS. 9A and 9B.

Rendering engine 446 can receive a 3D mesh and output it as a "hologram" via an XR headset. In some implementations, this can include rendering the 3D mesh on a display or projecting the 3D mesh into the eyes of the user. In some implementations, this projection can be accomplished by flattening the 3D mesh into multiple 2D planes (one for each eye with different perspectives to preserve the 3D appearance to the user) and painting these 2D planes into an image, e.g., using MEMS mirrors and microLEDs, lasers, or other color projection systems, this light can then pass through a series of waveguides and filters to project them into a user's eyes. Additional details on rendering a generated 3D mesh are provided below in relation to FIGS. 2A and 2B, block 568 of FIG. 5B, and block 762 of FIG. 7B.

Self-view module 448 can generate, on a sending user's device, a view of that sending user based on color images (and in some cases also depth images) of the sending user. The self-view can allow the sending user to e.g., understand how they are being viewed by the recipient and/or better position herself in relation to the capture device for a holograph call. In some implementations, the self-view can be an image of the sending user, showing the user as she appears to the camera(s) of the holographic calling system. This provides a virtual "mirror" for the sending user, allowing the user to see how they will be viewed by the recipient user(s). In some implementations, the self-view can be displayed as an overlay onto the sending user's body, illustrating for the user which parts of the user's body is in the capture device's field-of-view. In yet further implementations, the self-view can show a third-person representation of the sending user in relation to a representation of the capture device. This implementation may also include recommendations on how the user can reposition herself or the capture device to improve capture quality. Additional details on generating a self-view are provided below in relation to FIG. 6.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5A:
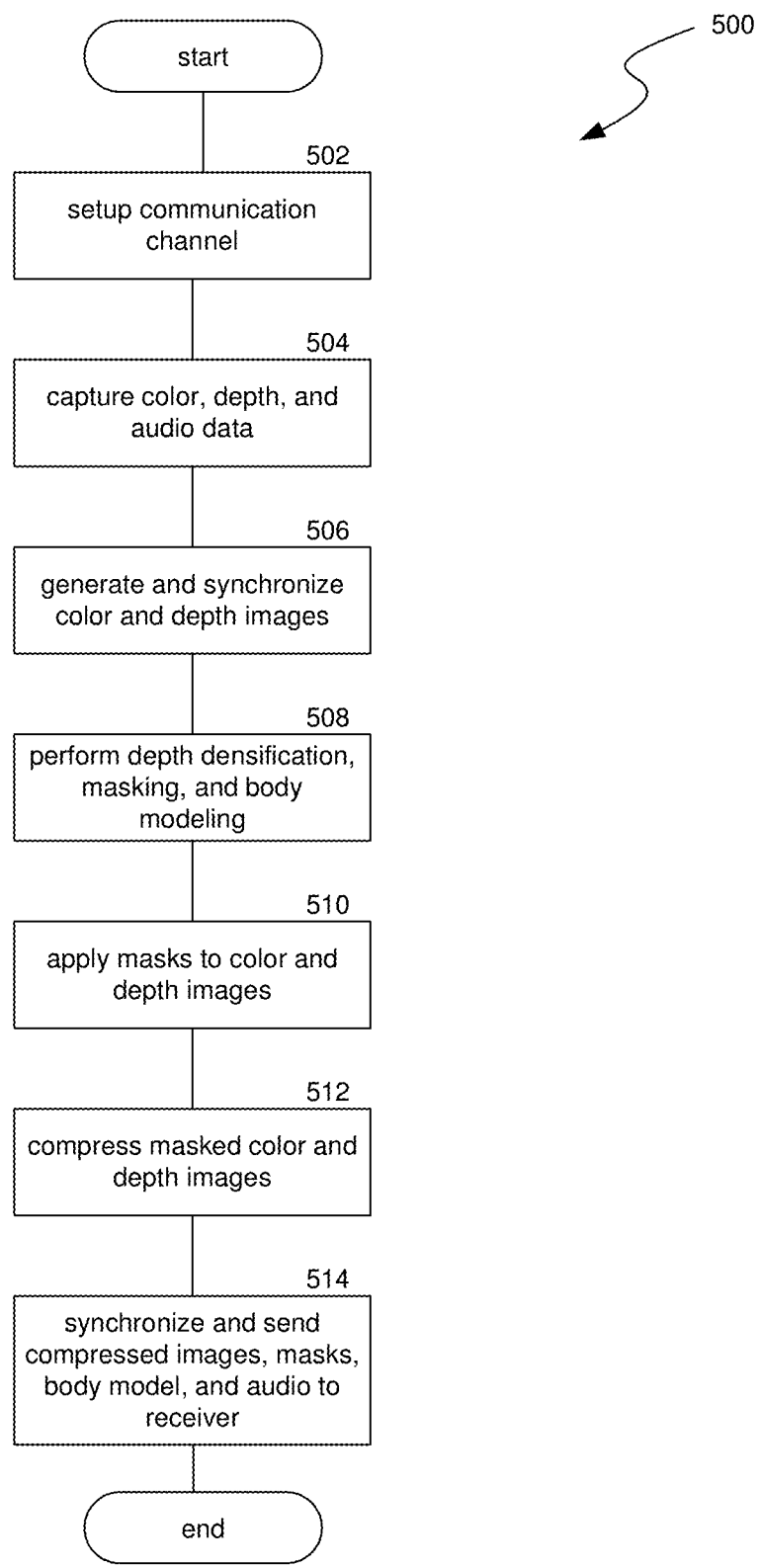
FIG. 5A is a flow diagram illustrating a sender-side process used in some implementations of the present technology for capturing and encoding data for a holographic call operating in a receiver-side reconstruction mode.
Figure 5B:
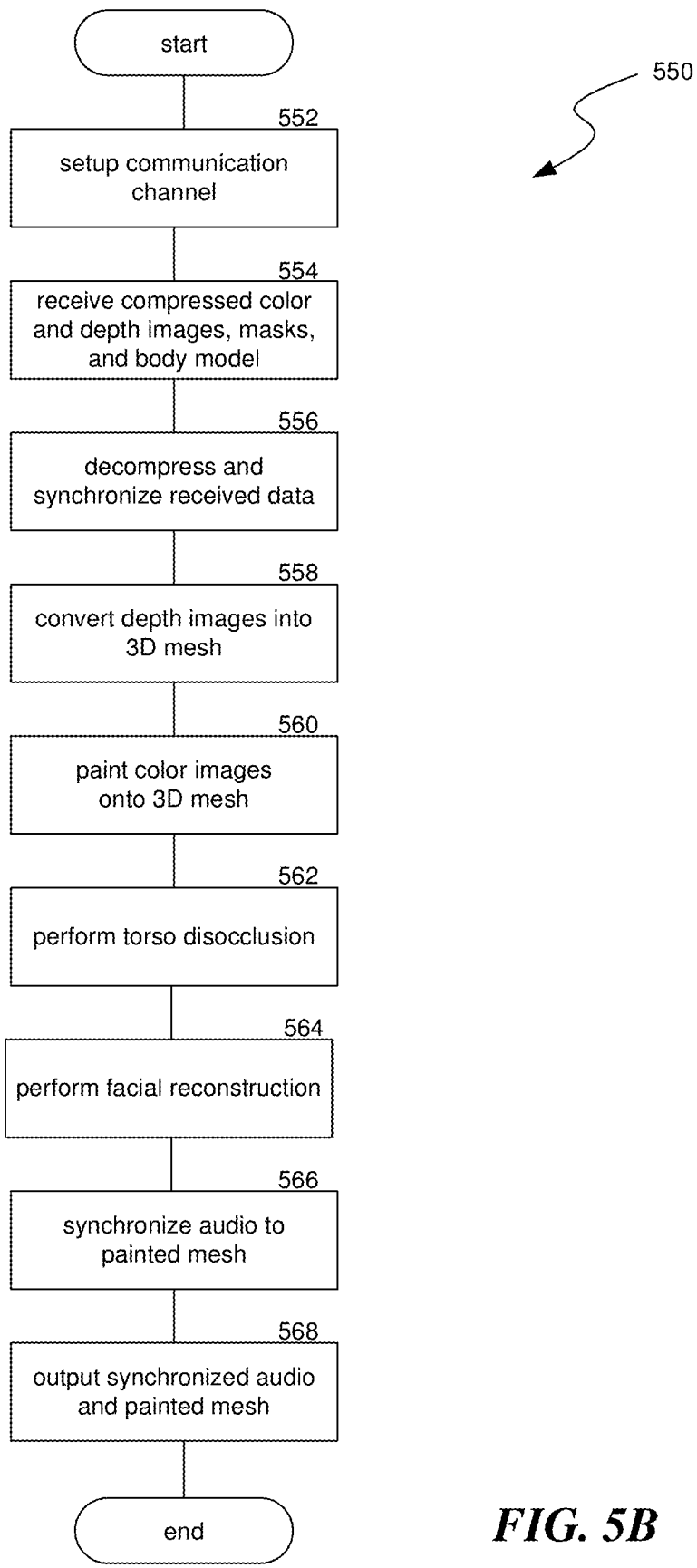
FIG. 5B is a flow diagram illustrating a receiver-side process used in some implementations of the present technology for decoding, reconstructing, and outputting data for the holographic call operating in the receiver-side reconstruction mode.

FIGS. 5A and 5B are flow diagrams illustrating processes 500 and 550 for performing a holographic call, in a receiver-side reconstruction mode, between a sending device and a receiving device. The receiver-side reconstruction mode is a mode where image data is reconstructed into a 3D representation on the receiving device in a holographic call. In some cases, the same device can act as both a sender device (sending a representation of a sending user to a recipient) and a recipient device (receiving and displaying a representation of a sender), and thus each of processes 500 and 550 can be performed by the same device, acting in the sending and receiving capacity. In some implementations, a holographic call can be performed between more than two devices, each implementing a sending version of process 500 and multiple recipient versions of process 550 (one for each other call participant).

FIG. 5A is a flow diagram illustrating the sender-side process 500 used in some implementations of the present technology for capturing and encoding data for a holographic call operating in a receiver-side reconstruction mode. In some implementations, process 500 can be performed in a response to a user initiating a holographic call between the sending device and one or more recipient devices.

At block 502, process 500 can setup or join a communication channel between the holographic call participants. This can be a real-time communication (RTC) channel that uses known technologies to facilitate low latency data transfer for the holographic call. The RTC channel can implement various encoding/decoding algorithms, compression/decompression algorithms, delivery or latency guarantees, security features, routing and transport algorithms, etc.

At block 504, process 500 can capture color data, depth data, and audio data. In various implementations, the captured audio can be from a microphone array on an XR headset or on a separate device. The color data can be black and white or full-color data captured by one or more traditional cameras (e.g., RGB cameras) of the computing system executing process 500. The depth data can be captured using a stereoscopic (multi-lens) depth camera; radar, lidar, sonar, or other time-of-flight (ToF) sensors; a structured light system; or other depth sensing technologies. For example, a structured light system can emit patterns of light (e.g., dots, lines of infrared (IR) light) and a light sensor (e.g., an IR camera) can capture how that pattern is distorted, which the holographic calling system can use to compute distances to parts of the pattern. In some implementations, process 500 can be performed using an XR system including a headset. A device separate from the headset (e.g., device 254) can include the color capture camera(s) and depth sensor(s). These camera(s) and sensor(s) can be placed away from, and directed toward the sending user, e.g., in a range of 0.2 meters to 3 meters distant from the sending user. In some implementations, the holographic calling system can provide guidance for the sending user (e.g., by painting virtual placement recommendations into the user's environment) on how and where to place the separate device. In some implementations, cameras or sensors on the XR headset can also capture color and/or depth data, e.g., tracking the position of the user's eyes, facial appearance behind the XR headset, etc. In some implementations, the separate device can be a smartphone and the sending user may or may not also employ an XR headset.

At block 506, process 500 can coalesce data feeds from the color camera(s) into color images and from the depth sensor(s) into depth images. Where the captured depth data is dense enough, the depth images can be created such that each pixel in the depth image is associated with a corresponding depth. Where the depth data is not initially dense enough to assign a depth to each pixel (e.g., where the depth data is structured light), a densification process (see block 508) can be performed to extrapolate depth data for each point in the depth image. In some implementations, process 500 only captures one RGB image stream at a time. In other cases, two or more color cameras capture RGB data to create multiple, simultaneous color images. Images from one of the color cameras (e.g., the camera physically closest to the depth sensor(s)) can capture higher resolution images (e.g., 1080p or 4k) used to create a texture for a hologram. The other image can be captured at a lower resolution (e.g., 640×480) and/or the first image can be downscaled to the lower resolution, and this image or images can be used to perform local operations such as densification, masking, and body tracking (see block 508), where using the lower resolution image(s) saves power, processing capacity, and bandwidth. Timestamps on the data feeds can be used to synchronize the generated color images and depth images.

Figure 14:
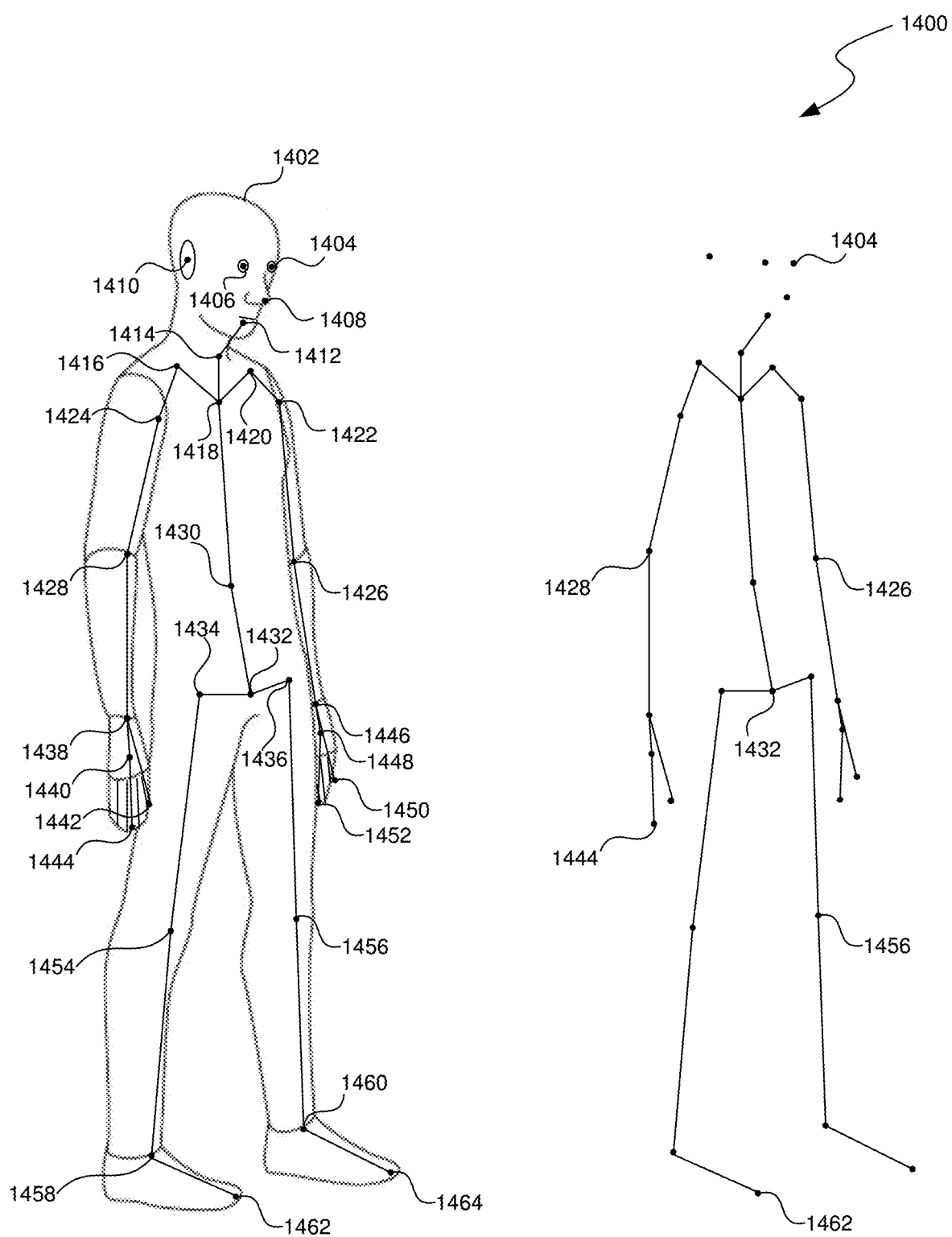
FIG. 14 is a conceptual diagram illustrating an example body model.

At block 508, process 500 can perform densification on the depth images (if the captured depth data is sparse—not including a depth value for each pixel); generate masks that segment various portions of the color and depth images (e.g., foreground/background, head, torso, arms, hands, XR headset, etc.); and generate a body model for the color and depth images (e.g., identifying points on the images corresponding to body positions—see FIG. 14). In various implementations, one or more machine learning models can be trained to generate the densified depth images, masks, and body model. In some cases, this/these model(s) can be trained using images of people in various environments and with various characteristics, where the images can be labeled with pixel-wise depth labels, masked portions, and body model labels. In some implementations, these labels can be human defined and/or based on depth sensors used to capture the images. In other implementations, the training items can be images of computer-generated people in computer generated environments, allowing the computing system to automatically assign depth data, masks, and body model points to the synthetic images. This model can take as input one or more color images and a depth image and output the densified depth image, masks, and body model points. In some implementations, the model can be an LSTM or other recurrent model, using stored previous model output (e.g., for a previous captured image) to improve model predictions. Training the model with multi-task learning can improve accuracy per-frame, as compared to individual models trained to perform each task separately. Additional details on densification, masking, and body model generation are provided below in relation to FIGS. 11A-11C.

At block 510, process 500 can apply one or more of the masks generated at block 508 to the color and densified depth images. For example, the background of the user in the captured images is not needed to generate the holographic representation of the sending user. By removing the background and only keeping the portions of the images that depict the sending user, power and processing capacity is saved on both the sending and receiving systems and the network bandwidth otherwise required to transmit this information is reduced.

At block 512, process 500 can compress A) the remaining portions (after the masking from block 510) of the color and depth images, B) the masks, and C) the body model. In some implementations, the compressions can encode 480p-1080p color images; 16 bpp depth images (480p); 1-4 bpp masks; and 5-20 body point positions (at about 18 bytes each). As examples, the masks and body model can be compressed using RVL or RLE compression and can be formatted as an array of binary data; the color images can be compressed using standard video compression techniques (e.g., HEVC); and the depth data can be compressed using RVL, RLE, TRVL, or H.264/5 standards.

At block 514, process 500 synchronize the captured audio data with the data compressed at block 512 (e.g., by matching timestamps); compress the audio using standard audio compression techniques; and can send the compressed audio and compressed image data (from block 512) over the communication channel established at block 502.

Process 500 can repeat as new audio and image data is captured by the holographic calling system, until the holographic call is ended.

FIG. 5B is a flow diagram illustrating a receiver-side process 550 used in some implementations of the present technology for decoding, reconstructing, and outputting data for the holographic call operating in the receiver-side reconstruction mode. In some implementations, process 550 can be performed in a response to initiating a holographic call with a sending device.

At block 552, process 550 can setup or join a communication channel between the holographic call participants. This can be the real-time communication (RTC) channel discussed above in relation to block 502.

At block 554, process 550 can receive from the sending system compressed color images, depth images, masks, and a body model (e.g., from a sending device executing process 500, sent at block 514) and compressed audio data.

At block 556, process 550 can decompress and synchronize the data received at block 554. Each compression algorithm used by the sender at block 512 and 514 will have a corresponding decompression algorithm that process 550 applies to obtain uncompressed versions of the data.

At block 558, process 550 can generate a 3D mesh representation of the sending user based on the decompressed depth data. Process 550 can accomplish this by constructing a 3D volume with points in 3D space corresponding to the depths defined for the pixels in the depth image. The initial result can be a 3D model with gaps where the depth sensors were not able to see portions of the sending user. Gaps resulting from occlusions (such as by the user's hands or arms) are filled in with the torso disocclusion process discussed below in relation to block 562. Other gaps can be filled with a generic model of a body. For example, the back of the sending user can be filled in with a generic model of a body (which may be selected from a set of generic models bodies based on characteristics of the sending user such as height, weight, gender, ethnicity, etc.) and which may be customized based on the sending user's current status (e.g., applying similar clothing, hair, accessories, etc.) Based on the body model, areas on the 3D mesh (e.g., eyes, mouth, shoulders, hands, etc.) can be labeled for texture applications at block 560.

At block 560, process 550 can paint the decompressed color image data (from block 556) onto the 3D mesh (generated at block 558). Painting the color data onto the 3D mesh provides a texture for the mesh, making it appear life-like. In some cases, features in the color data (e.g., eyes, mouth, shoulders, hands, etc.) can be identified either using the points from the body model or via object recognition techniques to match up portions of the color data with corresponding portions of the 3D mesh. In some implementations, various known transformations can be applied to the color images, making them skinable onto the 3D mesh.

Once generated, 3D mesh can be positioned relative to a viewpoint of the receiving user, accomplishing perspective correction where the rendered representation of the sending user is output to be world locked, even as the receiving user moves relative to the representation of the sending user. Thus, process 550 can automatically detect the position and orientation of the external capture device on the sending user's side and determine a viewpoint of the receiving user (e.g., based on tracked head position and eye gaze direction of the receiving user). The perspectives can be used to translate the representation of the sending user to appear for the viewpoint of the receiving user in six-degrees of freedom (6 DoF).

At block 562, process 550 can perform torso disocclusion on the body portion of the 3D mesh, filling in occlusions in the body portion of the 3D mesh. This can include filling in holes in the body portion with corresponding pieces from an existing 3D model of the sending user. The existing 3D model can be created using either a pre-scan process to get an initial 3D model of the sending user (e.g., upon device setup or at the beginning of a holographic call) or by building up the 3D model from snapshots taken earlier in the call where the body is not occluded. In some cases, later snapshots can be captured to periodically update the existing 3D model of the sending user. These images, together with the body model of the sending user, can be used to create the existing 3D model of the sending user, with meta-data labels defining particular points (e.g., "vertices") on the body. When process 550 identifies a hole in the 3D mesh, it can use the body model (discussed above) to identify corresponding vertices of the existing model, which it uses to fill in that hole in the 3D mesh. For example, the depth sensor may capture an image of the user while the user is gesturing with her hands in front of herself. Due to the placement of the user's hands, a portion of the user's torso may not be visible to the depth sensor. Thus, when the 3D mesh is created, there may be a hole in the representation of the sending user behind the user's hands. This can be filled in with that portion of the existing model of the sending user, created from a snapshot in the where the user's hands did not occlude the user's torso. Additional details on torso disocclusion are provided below in relation to FIG. 10.

At block 564, process 550 can perform facial reconstruction on the head portion of the 3D mesh, removing the XR device the sending user may be wearing from the representation of the sending user or making the lenses of that XR device appear transparent. The face reconstruction stage can accomplish this using either or both of a machine learning approach or a heuristic approach.

The machine learning approach can include training a machine learning model to take an image of a user's face including an XR device and provide either an image of the user's face without the XR device or with the lenses of the XR device appearing transparent. In some cases, the model can be trained using training items that are generated by taking, as ground truth, either an image of a user without and XR device or that image augmented with an XR device with the lens portion transparent, and pairing that ground truth image with a generated image showing the XR device added to the user image over the user's eyes, as it would be captured during a holographic call. The machine learning model can include an encoder, a geometry projection branch, and a texture projection branch. During training, the encoder can receive the input image with the XR device and encode it for application to machine learning models. The encoding of the image can be provided to both the geometry projection branch and the texture projection branch. The geometry projection branch can predict a geometry (3D mesh) of the user's face excluding the XR device and the texture projection branch can predict a texture of the user's face, also excluding the XR device. In some implementations, training the model can include comparing a geometry generated for the ground truth in the training item with the predicted geometry and applying a first set of loss functions to update parameters of the geometry projection branch, training it. Similarly in these implementations, the training can further include comparing a texture generated for the ground truth in the training item with the predicted texture and applying a second set of loss functions to update parameters of the texture projection branch, training it also. In other implementations, the predicted texture can be painted onto the predicted geometry and produce and output image; the training can include comparing the ground truth in the training item with the output image and applying a set of loss functions to update parameters of both the geometry projection branch and the texture projection branch, training the entire model. Once the model is trained, it can be applied by process 550 during a holographic call to receive an image of the sending user wearing an XR device and produce either an image of the user without the XR device or with the lenses transparent. Additional details on face reconstruction using the machine learning approach are provided below in relation FIGS. 8A and 8B.

The heuristic approach to face reconstruction can include performing a pre-scan of the sending user's face while that user is not wearing the XR device. This pre-scan can be used to generate a 3D mesh of the user's face, which can further be transformed into multiple meshes for different user expressions. During the holographic call, process 550 can analyze an input image of the user wearing the XR device to determine a head pose and facial expression of the user. Process 550 can then select one or more of the expression meshes corresponding to the determined facial expression and blend them into an output mesh corresponding to the user's current expression. Finally, process 550 can apply live depth data and color data (from block 556) for the sending user, to adjust the output mesh to more closely resemble the sending user. The result of this adjustment can be a live reconstruction of the user's face without the XR device or, if the XR device with transparent lenses is desired, the user's face with a 3D model of the XR device with transparent lenses can be added to the output mesh. Additional details on face reconstruction using the heuristic approach are provided below in relation FIGS. 9A and 9B.

At block 566, process 550 can synchronize the decompressed audio data, from block 556 with the 3D mesh by matching timestamps added to the audio based on when it was captured with timestamps on the color and depth images used to create the 3D mesh.

At block 568, process 550 can output the synchronized audio and painted mesh. In various implementations, this can include outputting the 3D mesh as a virtual object through a rendering engine in an XR display device; displaying the 3D mesh on a screen (e.g., a smartphone screen); and/or playing the audio through speakers, bone or cartilage conduction systems, etc.

Process 550 can repeat, as new data is received over the communication channel, until the holographic call is ended.

Figure 6:
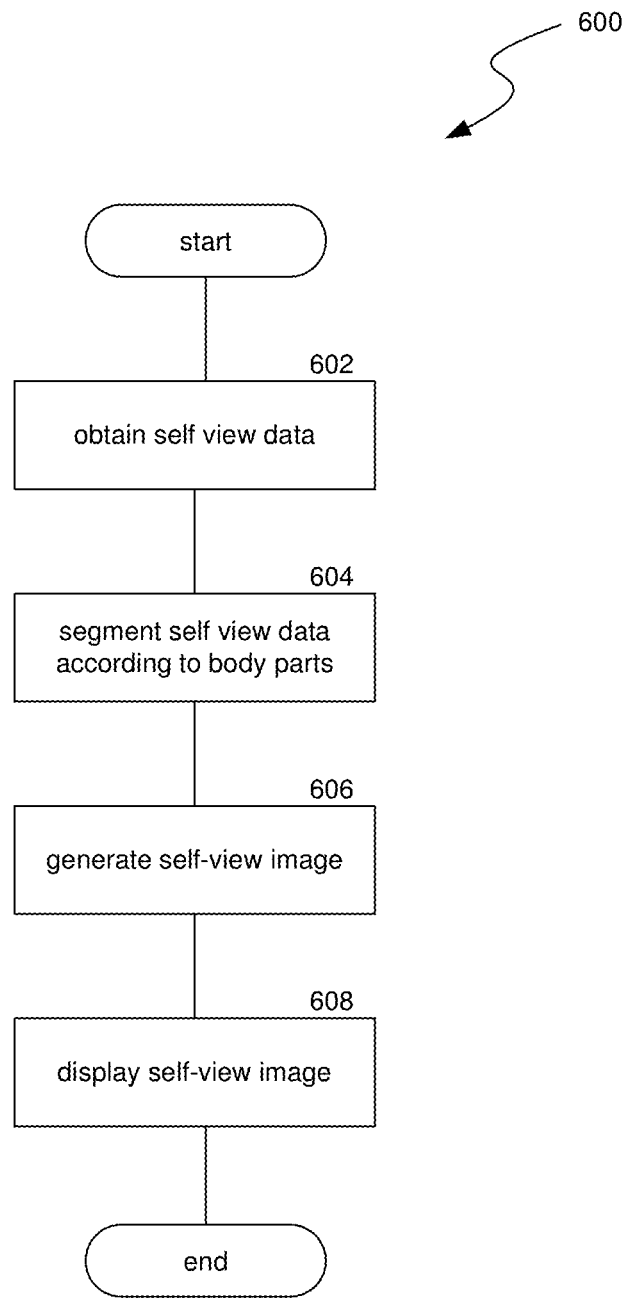
FIG. 6 is a flow diagram illustrating a sender-side process used in some implementations of the present technology for generating a self-view of the sender.

FIG. 6 is a flow diagram illustrating a sender-side process 600 used in some implementations of the present technology for generating a self-view of the sender. In some implementations, process 600 can be performed on a sender-side device of the holographic calling pipeline, in response to a user command to present a self-view of the sending user, automatically as a holographic call progresses, or in response to certain triggers such as the holographic calling system detecting that part of the sending user is not in the view of one or more of the cameras of the holographic calling system.

At block 602, process 600 can obtain self-view data. The self-view data can be color images captured of the sending user. In some implementations, the self-view data can be the color images generated at block 506 or 706. In some implementations, process 600 can also obtain additional data, such as the depth images generated at block 506 or 706.

At block 604, process 600 can segment the self-view data. This segmentation can include first removing the background (the parts of the images not depicting the user) from the foreground (the parts of the images depicting the user). In some cases, the segmentation can further identify, in the foreground, parts of the sending user's body, such as her face, arms, hands, torso, etc. In some implementations, the segmentation can be obtained from the results of block 508 or 708.

At block 606, process 600 can generate a self-view image using the segmented self-view data from block 604. And at block 608, process 600 can output that self-view image.

In some implementations, the self-view can be an image of the sending user, showing the user as she appears to the camera(s) of the holographic calling system. This provides a "virtual mirror" for the sending user, allowing the user to see how they will be viewed by the recipient user(s). For example, this self-view can be displayed in a virtual panel that appears next to a hologram of the other holographic call participant(s). This can also help the sending user know whether she is positioned in the camera's view, allowing her to reposition herself or the capture device to improve the capture quality.

In some implementations, the self-view can be displayed as an overlay onto the sending user's body, illustrating for the user which parts of the user's body is in the capture device's field-of-view. For example, if the capture device can see all of the sending user except her right arm, the user may look down and see the self-view image painted onto herself, excluding her right arm. Alternatively, process 600 may accentuate the parts the capture device cannot see, so when the user looks down, she may see her right arm highlighted (e.g., in red) suggesting that body part is out of the capture device's field-of-view.

In yet further implementations, the self-view can show a third-person representation of the sending user in relation to a representation of the capture device. For example, the image of the sending user can be created in miniature as a third-person view of the user showing a representation of the capture field-of-view of the capture device and how the user's position fits within that field-of-view. This implementation may also include recommendations on how the user can reposition herself or the capture device to improve capture quality.

In some cases, multiple of the above implementations may be used together, e.g., showing both the mirror view and the third-person view; or showing both the third-person view and the overlay view.

Figure 7A:
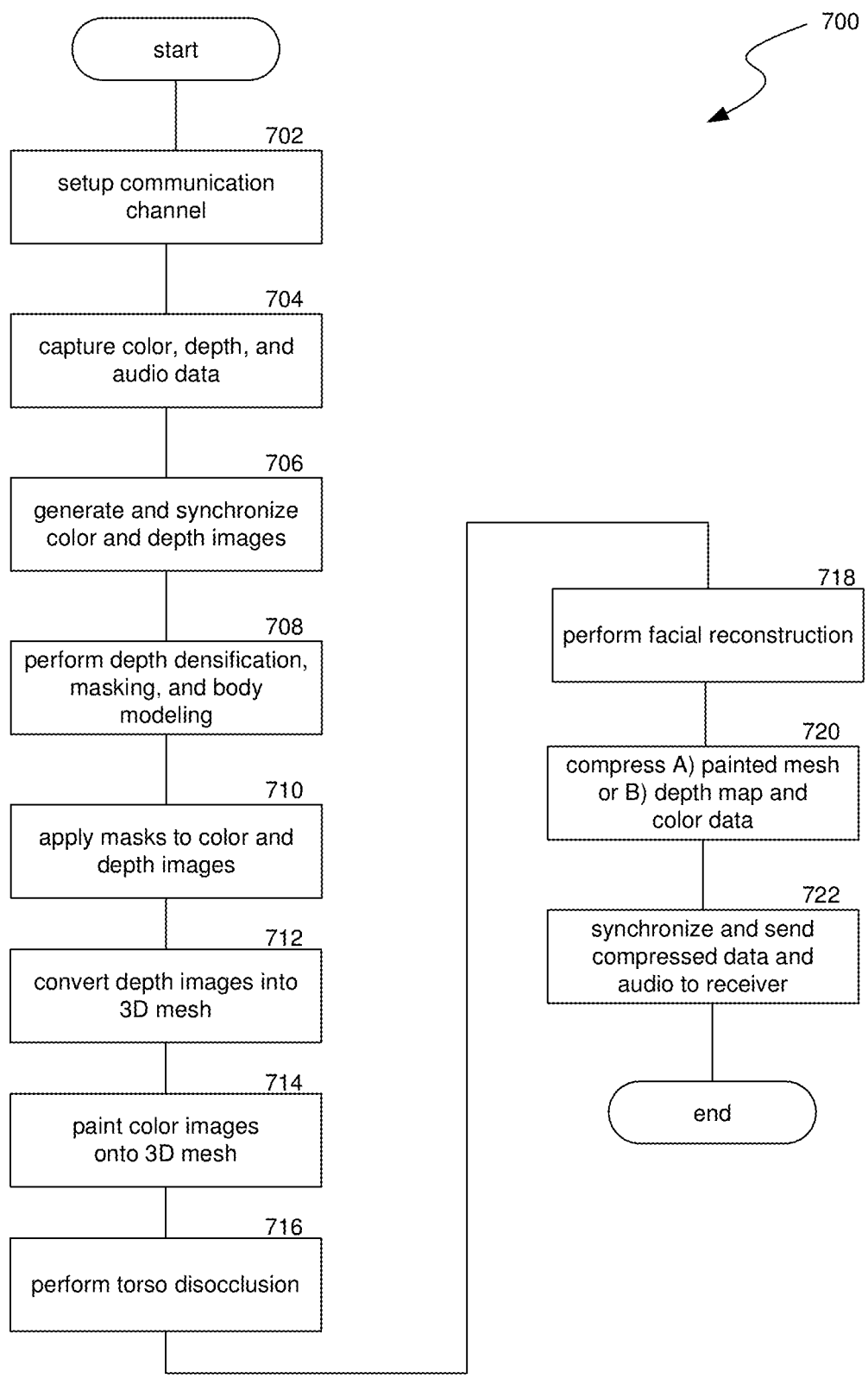
FIG. 7A is a flow diagram illustrating a sender-side process used in some implementations of the present technology for capturing, reconstructing, and encoding data for a holographic call operating in a sender-side reconstruction mode.
Figure 7B:
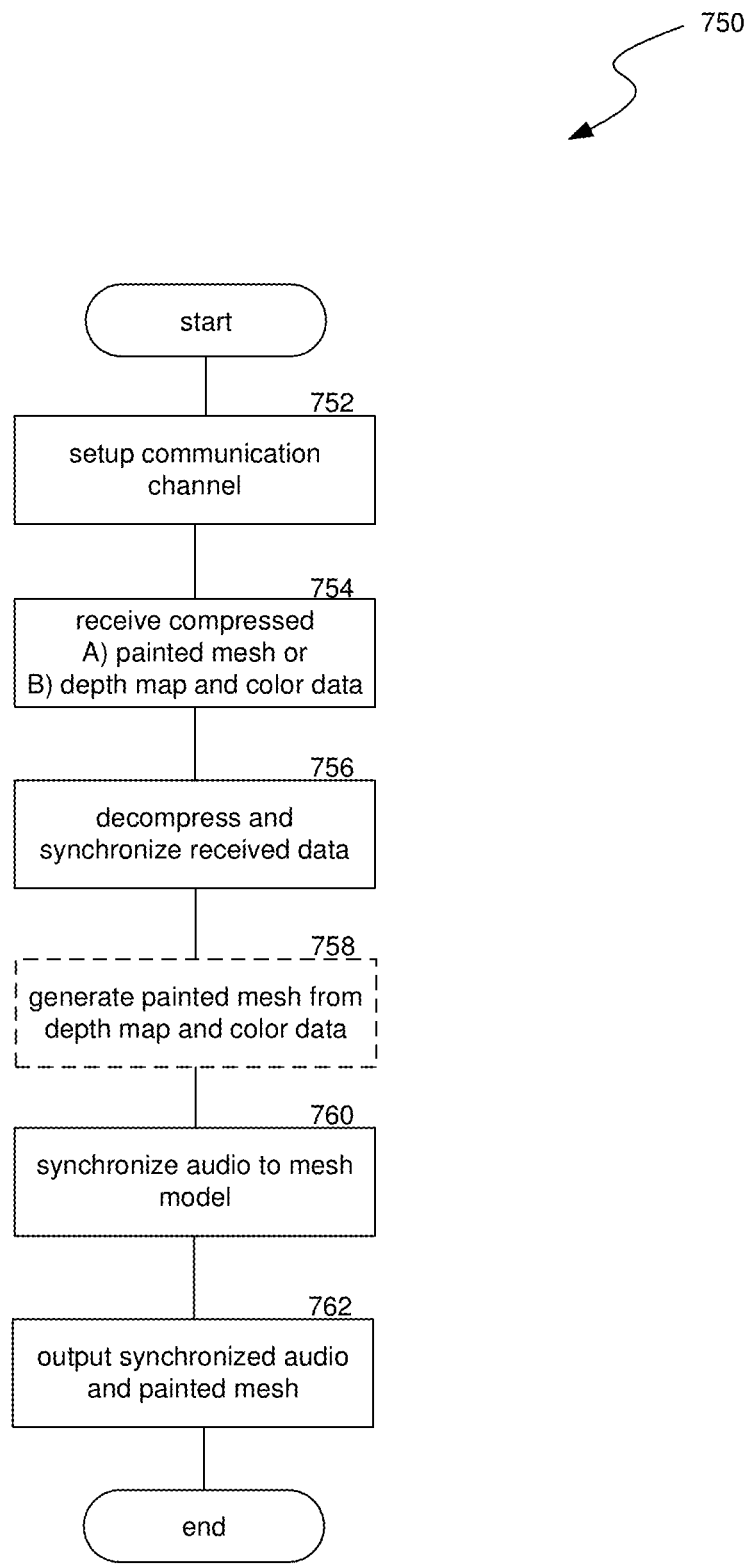
FIG. 7B is a flow diagram illustrating a receiver-side process used in some implementations of the present technology for decoding and displaying data for the holographic call operating in the sender-side reconstruction mode.

FIGS. 7A and 7B are flow diagrams illustrating processes 700 and 750 for performing a holographic call, in a sender-side reconstruction mode, between a sending device and a receiving device. The sender-side reconstruction mode is a mode where image data is reconstructed into a 3D representation on the sending device in a holographic call. In some cases, the same device can act as both a sender device (sending a representation of a sending user to a recipient) and a recipient device (receiving and displaying a representation of a sender), and thus each of processes 700 and 750 can be performed by the same device, acting in the sending and receiving capacity. In some implementations, a holographic call can be performed between more than two devices, each implementing a sending version of process 700 and multiple recipient versions of process 750 (one for each other call participant).

FIG. 7A is a flow diagram illustrating a sender-side process 700 used in some implementations of the present technology for capturing, reconstructing, and encoding data for a holographic call operating in a sender-side reconstruction mode. In some implementations, process 700 can be performed in a response to a user initiating a holographic call between the sending device and one or more recipient devices.

At block 702, process 700 can setup or join a communication channel between the holographic call participants. This can be a real-time communication (RTC) channel that uses known technologies to facilitate low latency data transfer for the holographic call. The RTC channel can implement various encoding/decoding algorithms, compression/decompression algorithms, delivery guarantees, security features, routing and transport algorithms, etc.

At block 704, process 700 can capture color data, depth data, and audio data. In various implementations, the captured audio can be from a microphone array on an XR headset or on a separate device. The color data can be black and white or full-color data captured by one or more traditional cameras (e.g., RGB cameras) of the computing system executing process 700. The depth data can be captured using a stereoscopic (multi-lens) depth camera; radar, lidar, sonar, or other time-of-flight (ToF) sensors; a structured light system; or other depth sensing technologies. For example, a structured light system can emit patterns of light (e.g., dots, lines of infrared (IR) light) and a light sensor (e.g., an IR camera) can capture how that pattern is distorted, which the holographic calling system can use to compute distances to parts of the pattern. In some implementations, process 700 can be performed using an XR system including a headset. A device separate from the headset (e.g., device 254) can include the color capture camera(s) and depth sensor(s). These camera(s) and sensor(s) can be placed away from, and directed toward the sending user, e.g., in a range of 0.2 meters to 3 meters distant from the sending user. In some implementations, the holographic calling system can provide guidance for the sending user (e.g., by painting virtual placement recommendations into the user's environment) on how and where to place the separate device. In some implementations, cameras or sensors on the XR headset can also capture color and/or depth data, e.g., tracking the position of the user's eyes, facial appearance behind the XR headset, etc. In some implementations, the separate device can be a smartphone and the sending user may or may not also employ an XR headset.

At block 706, process 700 can coalesce data feed feeds from the color camera(s) into color images and from the depth sensor(s) into depth images. Where the captured depth data is dense enough, the depth images can be created such that each pixel in the depth image is associated with a corresponding depth. Where the depth data is not initially dense enough to assign a depth to each pixel (e.g., where the depth data is structured light), a densification process (see block 708) can be performed to extrapolate depth data for each point in the depth image. In some implementations, process 700 only captures one RGB image stream at a time. In other cases, two or more color cameras capture RGB data to create multiple, simultaneous color images. Images from one of the color cameras (e.g., the camera physically closest to the depth sensor(s)) can capture higher resolution images (e.g., 1080p or 4k) used to create a texture for a hologram. The other image can be captured at a lower resolution (e.g., 640×480) and/or the first image can be downscaled to the lower resolution, and this image or images can be used to perform local operations such as densification, masking, and body tracking (see block 708), where using the lower resolution image(s) saves power, processing capacity, and bandwidth. Timestamps on the data feeds can be used to synchronize the generated color images and depth images.

At block 708, process 700 can perform densification on the depth images (if the captured depth data is sparse—not including a depth value for each pixel); generate masks that segment various portions of the color and depth images (e.g., foreground/background, head, torso, arms, hands, XR headset, etc.); and generate a body model for the color and depth images (e.g., identifying points on the images corresponding to body positions). In various implementations, one or more machine learning models can be trained to generate the densified depth images, masks, and body model. In some cases, this/these model(s) can be trained using images of people in various environments and with various characteristics, where the images can be labeled with pixel-wise depth labels, masked portions, and body model labels. In some implementations, these labels can be human defined and/or based on depth sensors used to capture the images. In other implementations, the training items can be images of computer-generated people in computer generated environments, allowing the computing system to automatically assign depth data, masks, and body model points to the synthetic images. This model can take as input one or more color images and a depth image and output the densified depth image, masks, and body model points. In some implementations, the model can be an LSTM or other recurrent model, using stored previous model output (e.g., for a previous captured image) to improve model predictions. Training the model with multi-task learning can improve accuracy per-frame, as compared to individual models trained to perform each task separately. Additional details on densification, masking, and body model generation are provided below in relation to FIGS. 11A-11C.

At block 710, process 700 can apply one or more of the masks generated at block 708 to the color and densified depth images. For example, the background of the user in the captured images is not needed to generate the holographic representation of the sending user. By removing the background and only keeping the portions of the images that depict the sending user, power and processing capacity is saved on both the sending and receiving systems and the network bandwidth otherwise required to transmit this information is reduced.

At block 712, process 700 can generate a 3D mesh representation of the sending user based on masked data generated at block 710. Process 700 can accomplish this by constructing a 3D volume with points in 3D space corresponding to the depths defined for the pixels in the depth image. The initial result can be a 3D model with gaps where the depth sensors were not able to see portions of the sending user. Gaps resulting from occlusions (such as by the user's hands or arms) are filled in with the torso disocclusion process discussed below in relation to block 716. Other gaps can be filled with a generic model of a body. For example, the back of the sending user can be filled in with a generic model of a body (which may be selected from a set of generic models of bodies based on characteristics of the sending user such as height, weight, gender, ethnicity, etc.) and which may be customized based on the sending user's current status (e.g., applying similar clothing, hair, accessories, etc.) Based on the body model, areas on the 3D mesh (e.g., eyes, mouth, shoulders, hands, etc.) can be labeled for texture applications at block 714.

At block 714, process 700 can paint the masked color image data (from block 710) onto the 3D mesh (generated at block 712). Painting the color data onto the 3D mesh provides a texture for the mesh, making it appear life-like. In some cases, features in the color data (e.g., eyes, mouth, shoulders, hands, etc.) can be identified either using the points from the body model or via object recognition techniques to match up portions of the color data with corresponding portions of the 3D mesh. In some implementations, various known transformations can be applied to the color images, making them skinable onto the 3D mesh.

At block 716, process 700 can perform torso disocclusion on the body portion of the 3D mesh, filling in occlusions in the body portion of the 3D mesh. This can include filling in holes in the body portion with corresponding pieces from an existing 3D model of the sending user. The existing 3D model can be created using either a pre-scan process to get an initial 3D model of the sending user (e.g., upon device setup or at the beginning of a holographic call) or by building up the 3D model from snapshots taken earlier in the call where the body is not occluded. In some cases, later snapshots can be captured to periodically update the existing 3D model of the sending user. These images, together with the body model of the sending user, can be used to create the existing 3D model of the sending user, with meta-data labels defining particular points (e.g., "vertices") on the body. When process 700 identifies a hole in the 3D mesh, it can use the body model (discussed above) to identify corresponding vertices of the existing model, which it uses to fill in that hole in the 3D mesh. For example, the depth sensor may capture an image of the user while the user is gesturing with her hands in front of herself. Due to the placement of the user's hands, a portion of the user's torso may not be visible to the depth sensor. Thus, when the 3D mesh is created, there may be a hole in the representation of the sending user behind the user's hands. This can be filled in with that portion of the existing model of the sending user, created from a snapshot in the where the user's hands did not occlude the user's torso. Additional details on torso disocclusion are provided below in relation to FIG. 10.

At block 718, process 700 can perform facial reconstruction on the head portion of the 3D mesh, removing the XR device the sending user may be wearing from the representation of the sending user or making the lenses of that XR device appear transparent. The face reconstruction stage can accomplish this using either or both of a machine learning approach or a heuristic approach.

The machine learning approach can include training a machine learning model to take an image of a user's face including an XR device and provide either an image of the user's face without the XR device or with the lenses of the XR device appearing transparent. In some cases, the model can be trained using training items that are generated by taking, as ground truth, either an image of a user without and XR device or that image augmented with an XR device with the lens portion transparent, and pairing that ground truth image with a generated image showing the XR device added to the user image over the user's eyes, as it would be captured during a holographic call. The machine learning model can include an encoder, a geometry projection branch, and a texture projection branch. During training, the encoder can receive the input image with the XR device and encode it for application to machine learning models. The encoding of the image can be provided to both the geometry projection branch and the texture projection branch. The geometry projection branch can predict a geometry (3D mesh) of the user's face excluding the XR device and the texture projection branch can predict a texture of the user's face, also excluding the XR device. In some implementations, training the model can include comparing a geometry generated for the ground truth in the training item with the predicted geometry and applying a first set of loss functions to update parameters of the geometry projection branch, training it. Similarly in these implementations, the training can further include comparing a texture generated for the ground truth in the training item with the predicted texture and applying a second set of loss functions to update parameters of the texture projection branch, training it also. In other implementations, the predicted texture can be painted onto the predicted geometry and produce and output image; the training can include comparing the ground truth in the training item with the output image and applying a set of loss functions to update parameters of both the geometry projection branch and the texture projection branch, training the entire model. Once the model is trained, it can be applied by process 550 during a holographic call to receive an image of the sending user wearing an XR device and produce either an image of the user without the XR device or with the lenses transparent. Additional details on face reconstruction using the machine learning approach are provided below in relation FIGS. 8A and 8B.

The heuristic approach to face reconstruction can include performing a pre-scan of the sending user's face while that user is not wearing the XR device. This pre-scan can be used to generate a 3D mesh of the user's face, which can further be transformed into multiple meshes for different user expressions. During the holographic call, process 700 can analyze an input image of the user wearing the XR device to determine a head pose and facial expression of the user. Process 700 can then select one or more of the expression meshes corresponding to the determined facial expression and blend them into an output mesh corresponding to the user's current expression. Finally, process 700 can apply live depth data and color data (from block 710) for the sending user, to adjust the output mesh to more closely resemble the sending user. The result of this adjustment can be a live reconstruction of the user's face without the XR device or, if the XR device with transparent lenses is desired, the user's face with a 3D model of the XR device with transparent lenses can be added to the output mesh. Additional details on face reconstruction using the heuristic approach are provided below in relation FIGS. 9A and 9B.

At block 720, process 700 can compress data, based on the completed mesh generated in blocks 712-718, to be sent to one or more recipients in the holographic call. In various implementations, the compression can be of A) the painted mesh from block 714 (with the results of the torso disocclusion from block 716 and facial reconstruction from block 718) or B) a depth map and color data based on this mesh. The mesh or depth data with color data can be compressed using RVL, RLE, TRVL, or H.264/5 standards. Because the disocclusion and facial reconstruction steps have been completed, data transmitted to the recipient may not include the masks and/or body model.

At block 722, process 700 synchronize the captured audio data with the data compressed at block 720 (e.g., by matching timestamps); compress the audio using standard audio compression techniques; and can send the compressed audio and compressed 3D data (from block 720) over the communication channel established at block 702.

Process 700 can repeat, as new audio and image data is captured by the holographic calling system, until the holographic call is ended.

FIG. 7B is a flow diagram illustrating a receiver-side process 750 used in some implementations of the present technology for decoding and displaying data for the holographic call operating in the sender-side reconstruction mode. In some implementations, process 750 can be performed in a response to initiating a holographic call with a sending device.

At block 752, process 750 can setup or join a communication channel between the holographic call participants. This can be the real-time communication (RTC) channel discussed above in relation to block 702. At block 754, process 750 can receive over the communication channel, from the sending system, compressed 3D data and audio data (e.g., compressed and sent at blocks 720 and 722).

At block 756, process 750 can decompress and synchronize the data received at block 754. Each compression algorithm used by the sender at block 720 and 722 will have a corresponding decompression algorithm that process 750 applies to obtain uncompressed versions of the data.

While as mentioned above, all blocks can be rearranged or excluded in various implementations, block 758 is illustrated in dashed lines to show a particular implementation where block 754 receives a painted mesh, and thus creating a painted mesh at block 758 can be skipped. At block 758, process 750 can generate a painted mesh from the depth map and color data receive at block 754 and decompressed at block 756. In some implementations, generating this painted mesh can be performed in a manner similar to the creating of a painted mesh described above in relation to blocks 712 and 714.

The received or generated 3D mesh can be positioned relative to a viewpoint of the receiving user, accomplishing perspective correction where the rendered representation of the sending user is output to be world locked, even as the receiving user moves relative to the representation of the sending user. Thus, process 750 can automatically obtain the position and orientation of the external capture device on the sending user's side and determine a viewpoint of the receiving user (e.g., based on tracked head position and eye gaze direction of the receiving user). The perspectives can be used to translate the representation of the sending user to appear for the viewpoint of the receiving user in six-degrees of freedom (6 DoF).

At block 760, process 750 can synchronize the decompressed audio data, from block 756 with the 3D mesh by matching timestamps added to the audio based on when it was captured with timestamps on the color and depth images used to create the 3D mesh.

At block 762, process 750 can output the synchronized audio and painted mesh. In various implementations, this can include outputting the 3D mesh as a virtual object through a rendering engine in an XR display device; displaying the 3D mesh on a screen (e.g., a smartphone screen); and/or playing the audio through speakers, bone or cartilage conduction systems, etc.

Process 750 can repeat as new data is received over the communication channel, until the holographic call is ended.

Figure 8A:
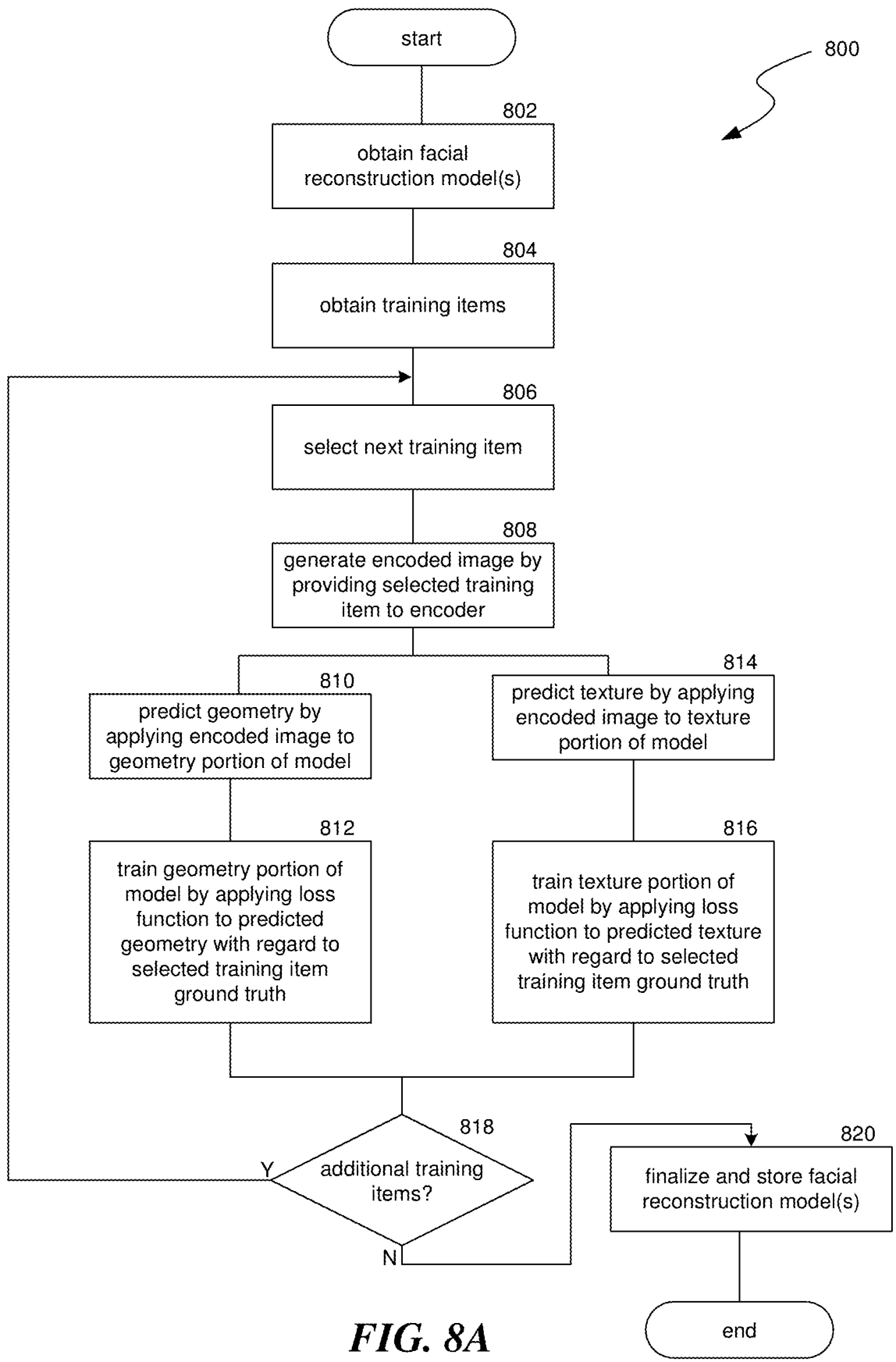
FIG. 8A is a flow diagram illustrating a process used in some implementations of the present technology for training a machine learning model to perform facial reconstruction on holographic data.

FIG. 8A is a flow diagram illustrating a process 800 used in some implementations of the present technology for training a machine learning model to perform facial reconstruction on holographic data. In some implementations, process 800 can be performed prior to initiating a holographic call, e.g., on a server system. Once trained, the machine learning model produced by process 800 can be provided to perform facial reconstruction on a sender-side or receiver-side device of a holographic call. Process 800 can be performed in response to a user supplying training data and executing a command to perform the training process.

At block 802, process 800 can obtain one or more machine learning models to be trained for facial reconstruction. A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. Examples of models include: neural networks, support vector machines, Parzen windows, Bayes, clustering models, reinforcement models, probability distributions, decision trees, decision tree forests, and others. Machine learning models can be configured for various situations, data types, sources, and output formats.

In some implementations, the obtained machine learning model can include one or more neural networks, each with multiple input nodes that receive a representation of an image. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, it can show a modified version of the input image, such as with an XR device removed or with the XR device's lenses being transparent. In some implementations, such neural networks, known as deep neural networks, can have multiple layers of intermediate nodes with different configurations, can be a combination of models that receive different parts of the input and/or input from other parts of the deep neural network, and/or can be a recumbent model (partially using output from previous iterations of applying the model as further input to produce results for the current input).

In some implementations, the obtained model can include A) an encoder that converts an image to model input (i.e., and "encoded image"), B) a geometry projection branch that can, based on the encoded image, predict a geometry (3D mesh) of the user's face excluding the XR device or making the lenses transparent, and C) a texture projection branch that can, based on the encoded image, predict a texture of the user's face excluding the XR device or making the lenses transparent. In some cases, the obtained model can also be a recumbent model, using the output of one or more previous iterations in the prediction for a next iteration.

At block 804, process 800 can obtain training items for training the obtained machine learning model. In some implementations, process 800 can generate the training items by taking images of people's faces and pairing them with that image where process 800 has added an image of the XR device over the eye area of the person's face. The original image without the XR device can be considered the ground truth the model is being trained to predict based on the input image of the face with the XR device. In other implementations, process 800 can generate the training items by taking images of people's faces and creating two versions of each such image: one where process 800 has added an image of the XR device over the eye area of the person's face with the transparent lenses and the other where process 800 has added an image of the XR device over the eye area of the person's face with the lenses not being transparent. The first original image without the XR device with transparent lenses can be considered the ground truth the model is being trained to predict based on the input image of the face with the XR device without transparent lenses. In yet further implementations, process 800 can obtain non-synthetic training data items that include ground truth images of users without an XR device on (or with the lenses removed) paired with a second image of the user in the same pose with the XR device on.

At block 806, process 800 can select a next training item from the set of training items obtained at block 804. If this is the first time process 800 has arrived at block 806, process 800 can select a first of the training items; otherwise process 800 can select a next training item from the set that has not yet been used in training the machine learning model.

At block 808, process 800 can generate an encoded image, from the input image in the selected training item showing the XR device, by applying the input image to an image encoder. In some implementations, the encoder can be a known model trained to receive an image and produce a representation of the image, e.g., as a high-dimensional vector. For example, the encoder can be a convolutional neural network such as one of the MobileNet encoders (e.g., MobileNetV2). In some implementations, the encoder can take further inputs in addition to the input image such as A) a depth scan or 3D mesh of the face of the person depicted in the input image and/or B) output from a previous iteration of applying the machine learning model to images of the same person in a different pose.

At block 810, process 800 can predict a geometry for the input image by applying the encoded image, from block 808, to the geometry prediction branch of the obtained machine learning model. In some implementations, the geometry prediction branch can be a neural network that receives an encoded image and produces a predicted geometry of the face depicted in the encoded image.

At block 812, process 800 can update the training of the geometry prediction branch of the machine learning model by comparing the predicted geometry with the geometry for the ground truth of the selected training item and, based on the comparison, apply a first set of one or more loss functions to update parameters of the geometry prediction branch. In some cases, the predicted geometry can be a predicted vector (weight of bases) that creates a reconstructed geometry of the face in the input image, which is compared with 3DMM parameters (e.g., shape, geometry, texture, 3D vertices, etc.) based on the ground truth image. The comparison can include determining, for each vertex in the predicted geometry, an offset in 3D space between that vertex and a corresponding vertex from the geometry of the ground truth training item. In some implementations, multiple loss functions can be applied to train the geometry branch, e.g., with L2 regularization, weighted parameter distance cost, and/or 3D vertex cost. The training can include applying regularization where the mean face of all captured faces is used, which removes outlier images/large difference values—avoiding overfitting.

Contemporaneous with blocks 810 and 812, block 814 and 816 can use the selected training item to update the training of the texture branch of the machine learning model. At block 814, process 800 can predict a texture for the input image by applying the encoded image, from block 808, to the texture prediction branch of the obtained machine learning model. In some implementations, the texture branch can include a decoder, such as a neural network with deconvolution layers having skip connections, that can warp the encoded input image to shape it for fitting onto a facial geometry while replacing the depicted XR device with predicted coloring for the user's face under the XR device.

At block 814, process 800 can update the training of the texture prediction branch of the machine learning model by comparing the predicted texture with the texture for the ground truth of the selected training item and, based on the comparison, apply a set of one or more loss functions to update parameters of the texture prediction branch. In some implementations, multiple loss functions can be applied to train the texture branch, e.g., with L1 loss (comparing distance between predicted and ground truth textures), structural similarity index measure (SSIM) loss, and/or perceptual loss (constraints on intermediate layers—making the predicted image perceptually similar to human interpretations of good images). The training can include applying regularization where the mean face of all captured faces is used, which removes outlier images/large difference values—avoiding overfitting.

In another embodiment, instead of training each of the geometry and texture branches separately, the predicted texture can be skinned onto the predicted geometry. The result can be flattened into a 2D image, which can be compared to the input image from the selected training item. Based on this comparison, the training of each of the geometry branch and texture branch can be updated.

Once the training of the machine learning model has been updated for the selected training item (e.g., both block 812 and 816 are complete), process 800 can proceed to block 818. At block 818, process 800 can determine whether there are additional training items, in the training item set obtained at block 804, which have not yet been used to train the machine learning mode. If so, process 800 can return to block 806 to select the next training item. If not, process 800 can continue to block 820. At block 820, process 800 can finalize and store the now-trained facial reconstruction model(s). For example, process 800 can store the trained machine learning model so that it can be provisioned to a computing system where it will be used in process 850, discussed below, for facial reconstruction (e.g., by a recipient system in process 550 or a sender system in process 700).

Figure 8B:
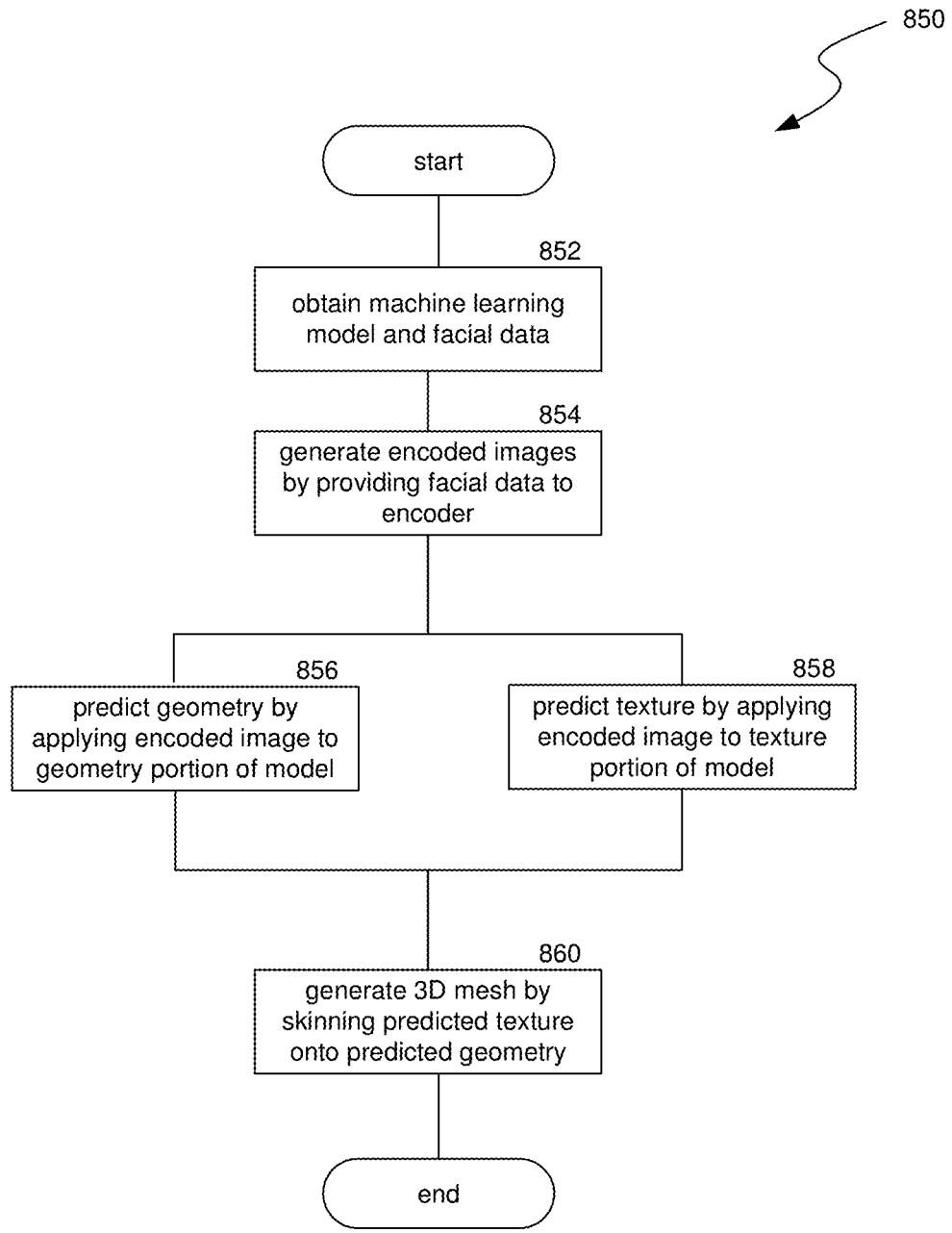
FIG. 8B is a flow diagram illustrating a process used in some implementations of the present technology for applying a trained machine learning model to perform facial reconstruction on holographic data.

FIG. 8B is a flow diagram illustrating a process 850 used in some implementations of the present technology for applying a trained machine learning model to perform facial reconstruction on holographic data. In various implementations, process 850 can be performed on a sender-side device of the holographic calling pipeline (e.g., as a sub-process of block 718) or on a receiver-side device of the holographic calling pipeline (e.g., as a sub-process of block 564).

At block 852, process 850 can obtain a facial reconstruction machine learning model and facial data for a sending user. The facial reconstruction model can be a model trained by process 800. In some implementations, the facial reconstruction model can include an encoder, a geometry branch, and a texture branch, as discussed above in relation to process 800. The facial data can include one or more images of the sending user. In some implementations where the facial reconstruction model was trained with additional data such as depth data or a pre-scan of the depicted user, these features can also be obtained for the sending user. In some implementations, the facial data can be obtained based on the data captured in process 500 or 700.

At block 854, process 850 can generate one or more encoded images by providing the facial data (e.g., image of the sending user) to an encoder (e.g., a MobileNetV2 encoder) of the facial reconstruction model.

In a manner similar to block 810, at block 856, process 850 can predict a geometry for the encoded image by applying the encoded image, from block 808, to the geometry prediction branch of the obtained facial reconstruction model. In some implementations, the geometry prediction branch can be a neural network that receives an encoded image and produces a predicted geometry of the face depicted in the encoded image.

Contemporaneous with block 856, process 850, at block 858 and in a manner similar to block 814, can predict a texture for the input image by applying the encoded image, from block 854, to the texture prediction branch of the facial reconstruction model. In some implementations, the texture branch can include a decoder, such as a neural network with deconvolution layers having skip connections, that can warp the encoded input image to shape it for fitting onto a facial geometry and replace coloring for the XR device with expected coloring for facial features.

At block 860, process 850 can skin the predicted texture on to the predicted geometry to generate a 3D mesh of the sending user's face, excluding an XR device the sending user may be wearing or making the lenses of the XR device appear transparent. In some implementations, eye tracking cameras of the XR device (e.g., incorporated into the XR device headset) can provide gaze direction for the sending user. Based on this gaze direction information, the eye direction of the generated 3D mesh representing the sending user can be updated to accurately reflect the current gaze direction of the sending user.

Figure 9A:
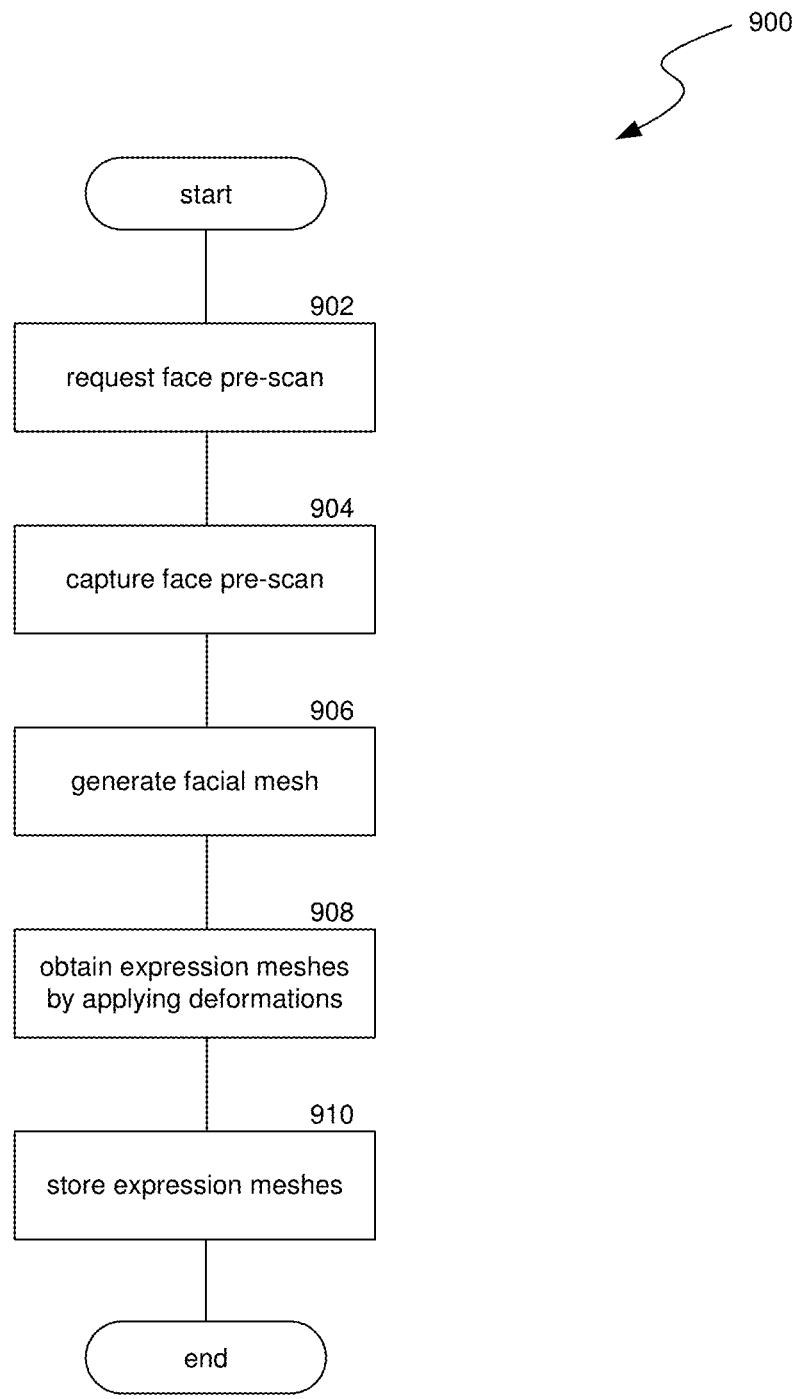
FIG. 9A is a flow diagram illustrating a process used in some implementations of the present technology for performing a facial pre-scan for heuristic facial reconstruction of holographic data.

FIG. 9A is a flow diagram illustrating a process 900 used in some implementations of the present technology for performing a facial pre-scan for heuristic facial reconstruction of holographic data. In various implementations, process 900 can be performed on a sender-side device of the holographic calling pipeline, e.g., as part of a setup process or as an initialization procedure for a holographic call.

At block 902, process 900 can request a pre-scan of the face of the sending user without a headset of the XR device. For example, when a user initiates a holographic call, the holographic calling system can provide an instruction to first remove the XR device headset and perform a facial scan. In some cases, the request can include instructions for the user to hold a neutral expression during the pre-scan. In some cases, a previous pre-scan may have been performed, in which case expression meshes for the sending user from that previous pre-scan may be used instead of performing process 900.

At block 904, process 900 can capture a pre-scan of the sending user's face while the sending user is not wearing the XR device headset. In various implementations, this can include capturing one or more color and/or depths images of the sending user. This may include instructing the sending user to rotate in-front of the capture device or move the capture device around the sending user's head to capture images of it from various angles.

At block 906, process 900 can generate a facial mesh based on the captured pre-scan data. Process 900 can accomplish this by identifying how the captured images in the pre-scan data knit together based on common color and depth patterns and positional data (e.g., IMU data) associated with the pre-scan data by the capture device. Process 900 can then construct a 3D mesh with points in 3D space corresponding to the depths defined for the pixels in depth images of the pre-scan data. Color data from the pre-scan data can be skinned on to the 3D mesh to create a life-like mesh of the sending user's face.

At block 908, process 900 can apply templates that cause expression deformations to the facial mesh generated at block 908, where each template deformation causes the facial mesh to have a particular expression, i.e., "expression meshes." In some cases, applying the template deformations can include first resizing and/or aligning particular template deformations to the facial mesh. In some implementations, instead of deforming a single facial mesh into multiple expression meshes, blocks 902-906 can be repeated, instructing the user to hold certain expressions, where the resulting meshes can be the expression meshes.

At block 910, process 900 can store the generated expression meshes for use in facial reconstruction by process 950. For example, process 900 can store the expression meshes so that they can be provisioned to a computing system where they will be used in process 950, discussed below, for facial reconstruction (e.g., by a recipient system in process 550 or a sender system in process 700).

Figure 9B:
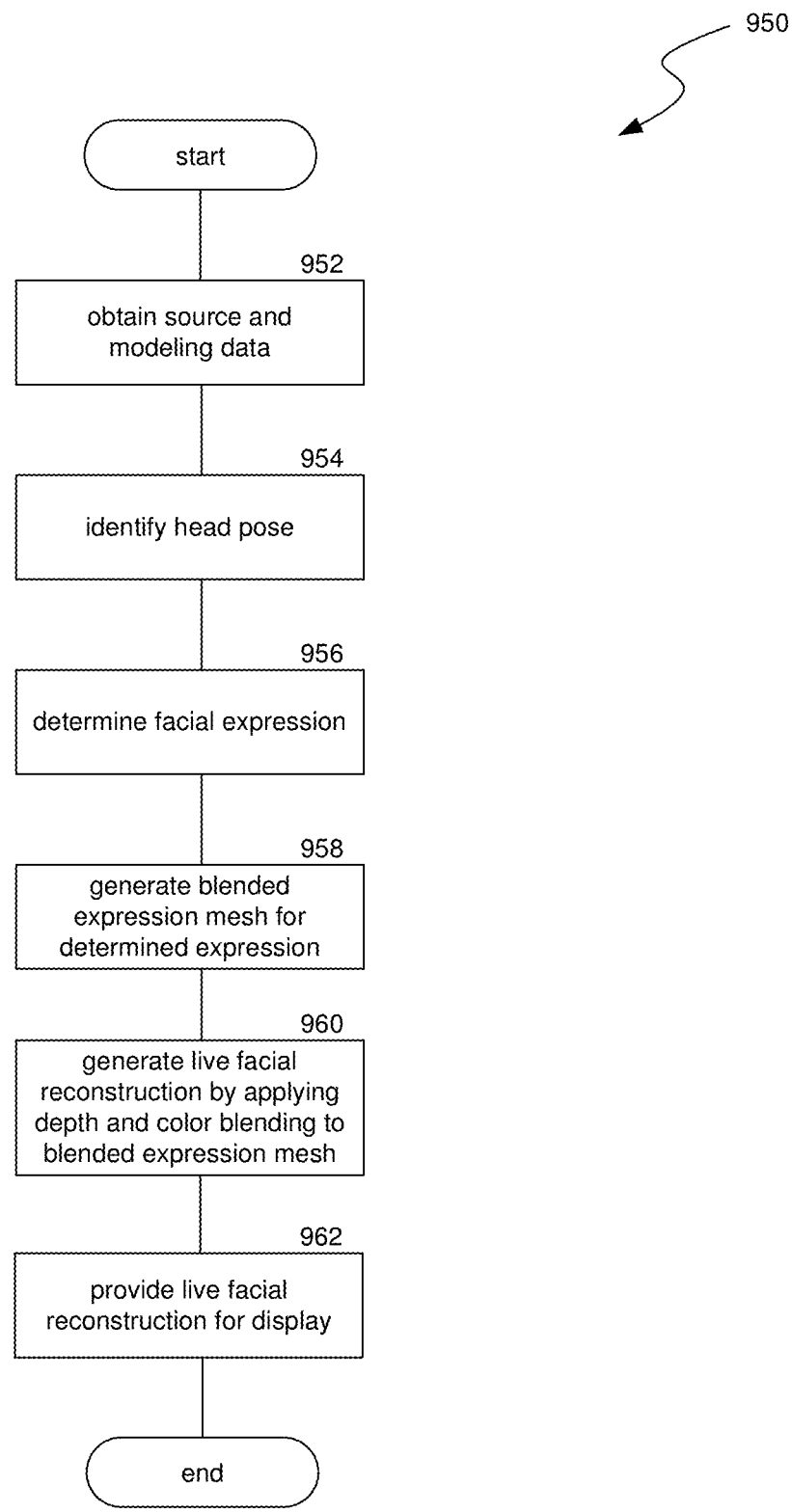
FIG. 9B is a flow diagram illustrating a process used in some implementations of the present technology for heuristic facial reconstruction of holographic data.

FIG. 9B is a flow diagram illustrating a process 950 used in some implementations of the present technology for heuristic facial reconstruction of holographic data. In various implementations, process 950 can be performed on a sender-side device of the holographic calling pipeline (e.g., as a sub-process of block 718) or on a receiver-side device of the holographic calling pipeline (e.g., as a sub-process of block 564).

At block 952, process 950 can obtain source and modeling data for facial reconstruction. The source data can include, for a current holographic call, A) color images and/or depth images (from block 506 or 706 or B) a current 3D mesh (from block 560 or 714). The source data can also include a body model and masks (from block 508 or 708) and eye gaze data for the sending user. The modeling data can include the expression meshes for the sending user, resulting from process 900.

At block 954, process 950 can identify a current head pose of the sending user. This head pose can define the posture of the head of the sending user in 3-dimentional space. In some cases, process 900 can identify the head pose as defined by the body model specified in the source data. In some cases, this can be updated using 2D facial landmark matching and/or 3D vertex matching for constraints to determine head pose as coordinates in 3D space. Identifying the head pose can further determine which parts of the images of the sending user's face depict a XR headset (e.g., using the masks from the source data). Process 900 can use the identified head pose to arrange the expression meshes, from block 952, to have the same head pose.

At block 956, process 950 can identify a current expression of the sending user. In some implementations, process 900 can identify the expression by applying an expression recognition algorithm, e.g., using a machine learning model trained to identify expressions form images of faces and/or from eye gaze data. At block 958, process 950 can select one or more of the expression meshes that most closely match the identified expression and can blend the selected expression meshes, as a linear combination, to produce an expression mesh with an expression similar to the current expression of the sending user. The resulting expression mesh is a mesh having an expression similar to the expression of the sending user but without wearing an XR headset or with lenses of the XR headset being transparent.

At block 960, process 950 can take the depth and color data, from the source data received at block 952, excluding the portions that are covered by the XR device headset, and blend them into the texture and geometry of the expression mesh produced at block 958. This can adjust the shape and coloring of the expression mesh to better match that of the sending user, producing a live facial reconstruction of the sending user. At block 962, process 950 can provide this live facial reconstruction of the sending user for display on a recipient device.

Figure 10:
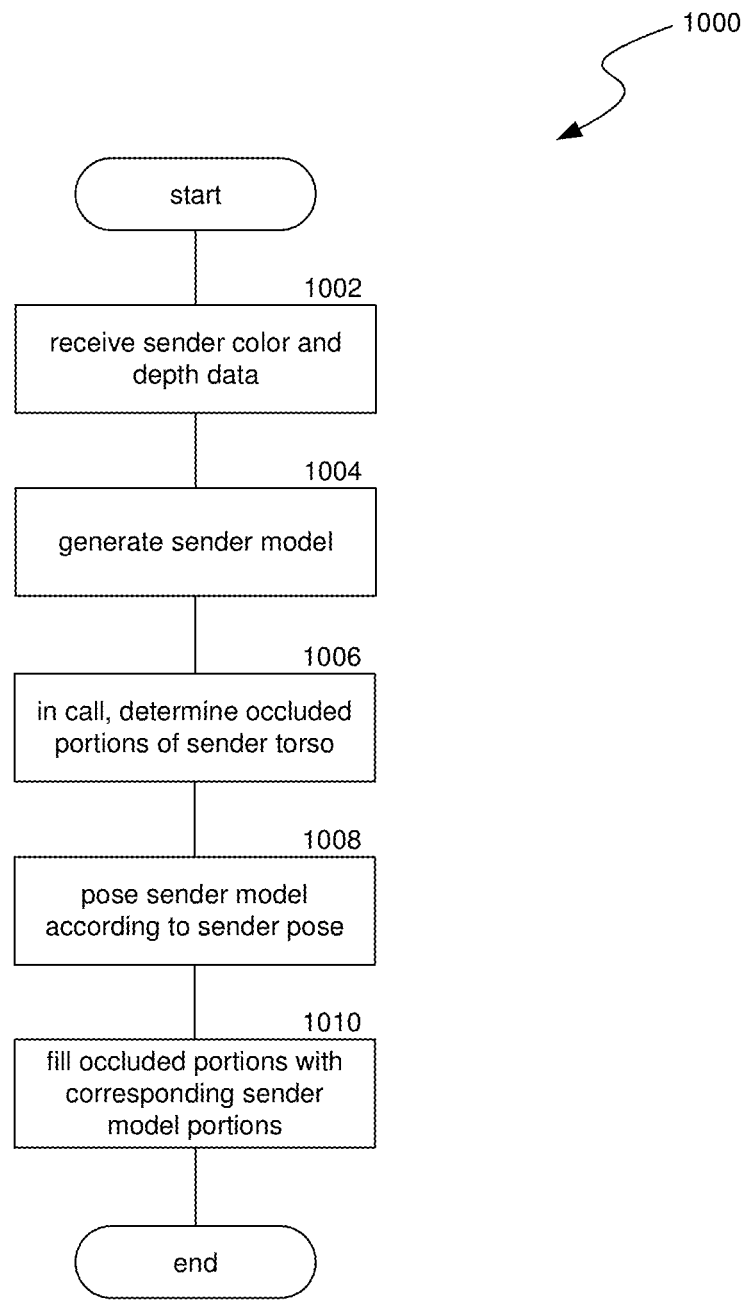
FIG. 10 is a flow diagram illustrating a process used in some implementations of the present technology for performing torso disocclusion on holographic data.

FIG. 10 is a flow diagram illustrating a process 1000 used in some implementations of the present technology for performing torso disocclusion on holographic data. In various implementations, process 1000 can be performed on a sender-side device of the holographic calling pipeline (e.g., as a sub-process of block 716 of FIG. 7A) or on a receiver-side device of the holographic calling pipeline (e.g., as a sub-process of block 562 of FIG. 5B). In some cases, portions of process 1000 (e.g., block 1002 and 1004) can be performed at the beginning of a holographic call or can be repeated throughout the holographic call. Other portions of process 1000 (e.g., block 1006-1010) can be performed for individual frames throughout the holographic call (e.g., as sub-processes of block 562 of FIG. 5B or block 716 of FIG. 7A).

At block 1002, process 1000 can receive color data and depth data for a sender. In some implementations, the color and depth data can be obtained through a pre-scan process for the sending user, whereby the sending user is instructed to position herself in front of the color and depth sensors in a manner that does not occlude the sending user's torso. In some cases, this can include instructing the sending user to move (e.g., turn around) so the sending user can be captured from multiple angles. In some implementations, the color and depth data can be obtained from one or more previous captured frames during the holographic call (e.g., frames where process 1000 determines that the sending user's torso is not occluded). In some cases, process 1000 can accumulate portions of multiple such frames, knitting them together to fill in portions of the sending user that are occluded in the frames.

At block 1004, process 1000 can generate a model of the sending user based on the color and depth data received at block 1002. This can include forming a mesh of the user based on the depth data and painting the color data onto the mesh. In some cases, forming the mesh can include fitting the depth data onto a kinematic user model. In some implementations, painting the color data onto the mesh can include matching identified portions of the color data with corresponding identified portions of the mesh. In some implementations, the sender model can be updated periodically as process 1000 captures new sender depth and color data at block 1002.

As a holographic call is performed, process 1000 can analyze a given frame and determine where a torso portion (as determined by a mask generated by a densification, segmentation, and body model) of the depicted sending user has occlusions. Process 1000 can identify such occlusions by reviewing depth data to determine if an object (such as the sending user's hands) are positioned in front of the sending user's torso, occluding the torso from the capture devices. In addition or alternatively, process 1000 can identify occlusions by analyzing a model of the sending user to determine if vertices for the sending user's torso are depicted.

At block 1008, process 1000 can pose the sender model, generated at block 1004 according to a determined current pose of the sending user. In some implementations, the current pose of the sending user can be based on a determined body model for the sending user (as discussed in relation to block 508 of FIG. 5A and 708 of FIG. 7A). A body model of the sender model can be adjusted to match the body model of the current sender, thereby posing the sender model to match the pose of the sending user.

At block 1010, process 1000 can determine portions of the posed sender model that match the occluded portions of the sending user's torso (as determined at block 1006) and can use those portions to fill in the occluded portions of the sending user. Both the live model of the sending user and the sender model generated at block 1004 can include labeled vertices specifying what part of the body each point corresponds to. The occlusion filling at block 1010 can occur by matching the vertices of the sender model to where vertices would be in the live model of the sender if the portions of the sender were not occluded. In some implementations, this matching can be based on the determined body model of the sending user. The live model of the sending user, with occlusions filled, can be displayed to the recipient user(s) in the ongoing holographic call.

Figure 11A:
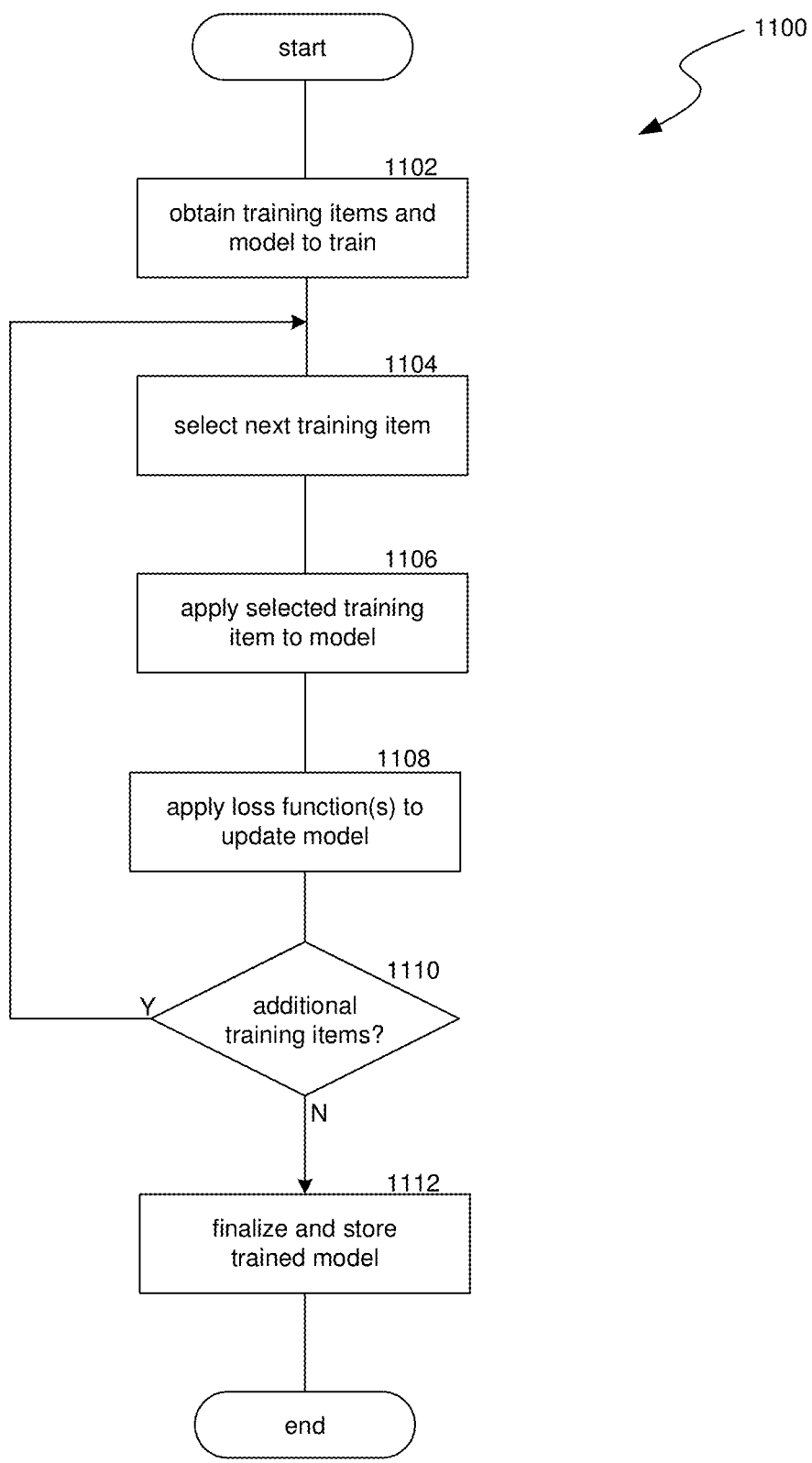
FIG. 11A is a flow diagram illustrating a process used in some implementations of the present technology for training a machine learning model to perform depth densification, masking, and body modeling on holographic data.

FIG. 11A is a flow diagram illustrating a process 1100 used in some implementations of the present technology for training a machine learning model to perform depth densification, masking, and body modeling on holographic data. In some implementations, process 1100 can be performed prior to initiating a holographic call, e.g., on a server system. Once trained, the machine learning model produced by process 1100 can be provided to perform densification, segmentation, and body modeling on a sender-side or receiver-side device. Process 1100 can be performed in response to a user supplying training data and executing a command to perform the training process.

At block 1102, process 1100 can obtain training data and a model to train as a densification, segmentation, and body modeling model. In some implementations, this can be a single machine learning model with decoders for each of the densification, segmentation, and bodying modeling tasks. In other implementations, a separate machine learning model can be trained for each task. In some implementations, the model backbone can be a type of neural network based model, such as an HRNet. The training data can be images of people in various environments with labels or tags ("ground truth") defined for depth values (per-pixel), masks identifying various segments (e.g., foreground, face, torso, arms, hands, XR device, etc.), and a body model for the current pose of the depicted person. In some implementations, these depictions of people in various environments can be computer-generated, allowing the computer to automatically assign the labeling data. For example, a computing system can generate an image by overlaying, over a depictions of an environment, a 3D mesh of a user (generated or captured) with known depth data, body part positions, and a body model. The training data can be generated depicting people with different attributes such as heights, skin tones, hair styles, genders, etc.; in various poses; with various clothing/accessories; and in different environments.

At block 1104, process 1100 can select a next training item from the training items obtained at block 1102. If this is the first time process 1100 has arrived at block 1104, process 1100 can select a first of the training items; otherwise process 1100 can select a next training item from the set that has not yet been used in training the machine learning model.

At block 1106, process 1100 can apply the training item selected at block 1104 to the model obtained at block 1102. This can include configuring the training data item for input to the model by selecting a subset of the depth data (e.g., a grid of the depth data values matching a depth data pattern captured by structured light sensors) and encoding the color data. In some implementations, the color data can first be converted to grayscale, which can allow the model to use less resources (e.g., power and compute resources) when being applied. In some implementations, configuring the input can also include removing or downscaling portions of the image that are not in areas of interest (as discussed below in relation to FIG. 11C), which can also allow the model to use less resources (e.g., power and compute resources) when being applied. In some implementations, the training items are in the form of a sequence from a video, in which case model output from one or more previous frames can be stored and then also used as additional input for the next frame. In some implementations, the training item can include multiple images of a person captured simultaneously from different angles (e.g., by different cameras) and the input images can be combined to include only the portions where they overlap. As used herein, events occurring "simultaneously" are events that occur at nearly the same time, but may not happen at the exact same instant. For example, two images captured "simultaneously" can be image captured for the same frame of a video call, but may be captured a few millisecond apart.

The selected training item, once configured for input to the model, can be applied first to a backbone portion of the model, such as a type of neural network based model, such as an HRNet. Output from the backbone can be stored as part of the model output, to be used as input for subsequent frames. The backbone output can also be supplied to a densification decoder to generate a densified (i.e., having additional depth values such as one per pixel) version of the input image; a segmentation decoder to generate the various masks that identify areas of the input image (e.g., foreground, face and other body parts, XR device, etc.); and a body modeling decoder that generates a body model of the current pose of the sending user.

At block 1108, the output from applying the model to the selected training item can be compared to the ground-truth labels for the training item and, based on the comparisons one or more loss functions can be applied to update parameters of the machine learning model, training it. In some implementations, one or more loss functions can be applied for each of the densification, segmentation, and body modeling tasks. Thus, the output from each decoder can be compared to the corresponding ground truth labels for the training item and a loss function can be applied based on that comparison. The loss function can adjust parameters of the backbone portion of the model and the decoder that produced the output for the current comparison.

At block 1110, process 1100 can determine whether there are additional training items, in the set of training items obtained at block 1102, that have not been applied to train the model. If so, process 1100 can return to block 1104. If not, process 1100 can proceed to block 1112. At block 1112, process 1100 can finalize and store the now-trained densification, segmentation and body modeling machine learning model. For example, process 1100 can store the trained machine learning model so that it can be provisioned to a computing system where it will be used in process 1150, discussed below, for densification, segmentation, and body modeling (e.g., in process 500 or 700).

Figure 11B:
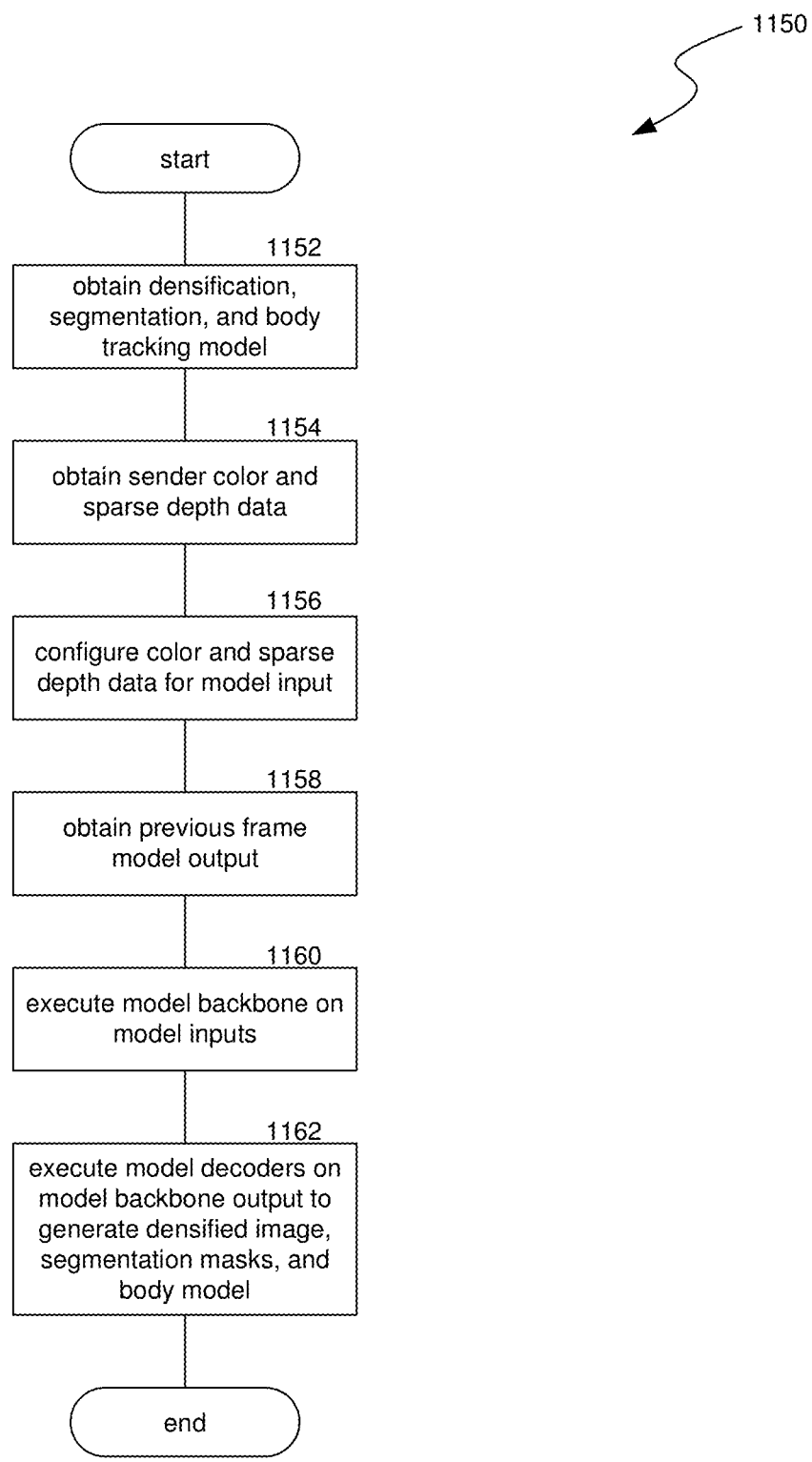
FIG. 11B is a flow diagram illustrating a process used in some implementations of the present technology for applying a trained machine learning model to perform depth densification, masking, and body modeling on holographic data.

FIG. 11B is a flow diagram illustrating a process 1150 used in some implementations of the present technology for applying a trained machine learning model to perform depth densification, masking, and body modeling on holographic data. In some implementations, process 1150 can be performed as a sub-process of process 500 of FIG. 5A, e.g., at block 508 or as a sub-process of process 700 of FIG. 7A, e.g., at block 708.

At block 1152, process 1150 can obtain a trained densification, segmentation, and body modeling machine learning model (or multiple models each trained for one of these tasks). For example, this can be the model trained by process 1100.

At block 1154, process 1150 can obtain color data and sparse depth data captured by a sender device for a holographic call. In some implementations, the sparse depth data can be structured light depth data and the color data can be one or more color images (e.g., obtained at block 504 or 704).

At block 1156, process 1150 can configure the color and sparse depth data for input to the obtained machine learning model. In some implementations, the color data can first be converted to grayscale, which can allow the model to use less resources (e.g., power and compute resources) when being applied. In some implementations, configuring the input can also include removing or downscaling portions of the image that are not in areas of interest (as discussed below in relation to FIG. 11C), which can also allow the model to use less resources (e.g., power and compute resources) when being applied. In some implementations, the color data can include multiple images captured simultaneously from different angles and the input images can be combined to include only the portions where they overlap.

At block 1158, process 1150 can obtain the output from the model stored from one or more previous frames of the holographic call. In various implementations, this model output can include the output from one or more of the decoders from the one or more previous frames and/or the output from the model backbone from the one or more previous frames.

At block 1160, process 1150 can apply the model backbone to the mode inputs as configured at block 1156 and 1158. In some implementations, the model backbone can be a type of neural network such as the HRNet image processing model.

At block 1162, the output from the model backbone can be provided to one or more decoders, such as a densification decoder to generate a densified (i.e., having additional depth values such as one per pixel) version of the input image; a segmentation decoder to generate the various masks that identify areas of the input image (e.g., foreground, face and other body parts, XR device, etc.); and/or a body modeling decoder that generates a body model of the current pose of the sending user.

Figure 11C:
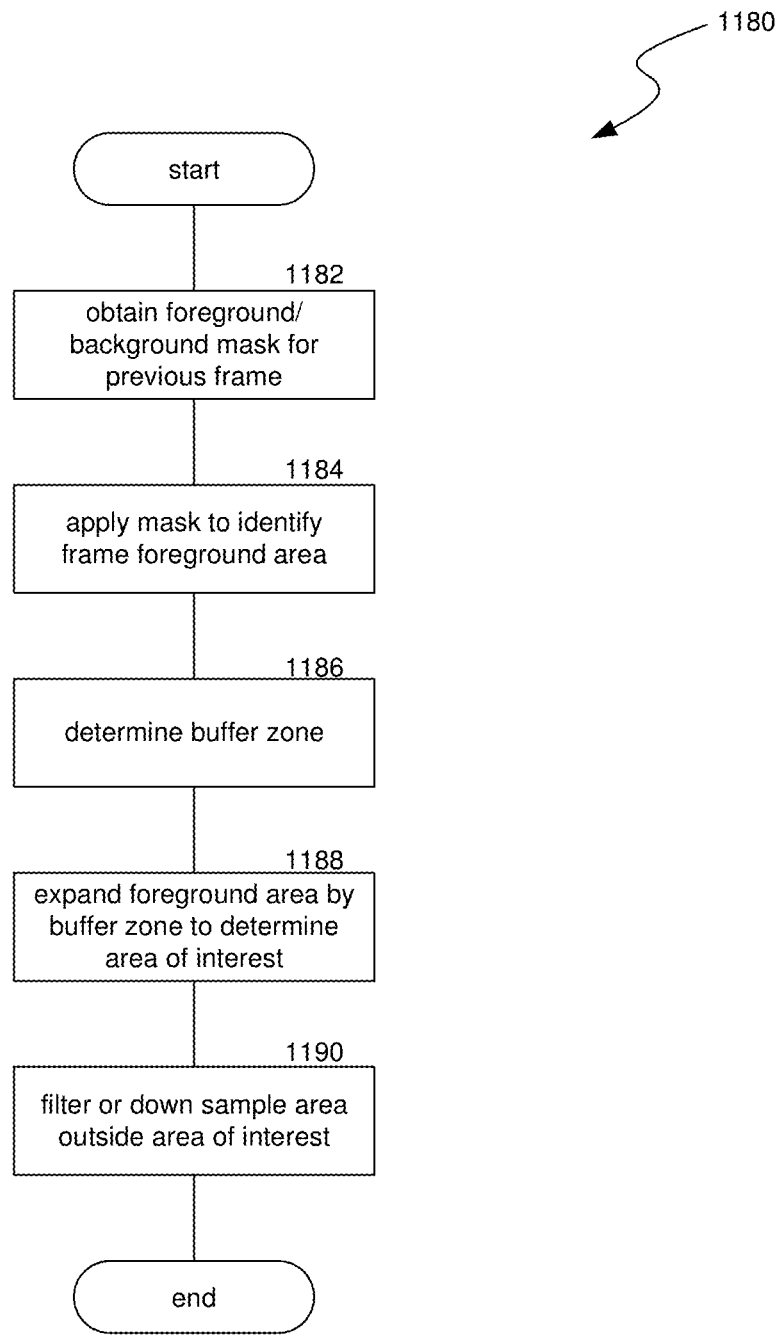
FIG. 11C is a flow diagram illustrating a process used in some implementations of the present technology for reducing resource expenditure by down sampling outside areas of interest.

FIG. 11C is a flow diagram illustrating a process 1180 used in some implementations of the present technology for reducing resource expenditure by down sampling outside areas of interest (or removing areas outside the areas of interest). In some implementations, process 1180 can be performed as a sub-process of process 1100 and/or 1150, e.g., at block 1106 and/or 1156.

At block 1182, process 1180 can obtain a mask that segments an image into foreground (the portion showing a user) and background (the portion not showing a user) segments. This can be a mask, generated by process 1150 for a previous input image. At block 1184, process 1180 can apply this mask to identify an expected foreground portion of an input image based on this identified actual foreground portion of the previous image.

At block 1186, process 180 can identify a buffer zone around the expected foreground portion identified at block 1184. The buffer zone is an area in which the user may have moved in the time since the previous image. The buffer zone can be expanded according to a framerate of the images (e.g., the buffer zone is larger for a larger time between images), a determined speed of movement of parts of the user (e.g., the buffer zone is larger around portions of a user determined to be moving faster), and/or a determined expected movement ranges of parts of the user in areas of the image (e.g., the buffer zone is larger around parts of the body such as hands and arms that are expected to have a greater range of motion). In some implementations, these determinations for the buffer zone can be based on one or more body models and/or segmentations determined for one or more previous images. For example, the speed of the user's hands can be based on how fast the hands were moving across the previous several frames.

At block 1188, process 1180 can expand the expected foreground area determined at block 1184 by the buffer zone determined at block 1186. This expansion of the expected foreground area then identifies an area in which it is very likely the image of the user is depicted in the current image, which becomes the area of interest.

At block 1190, process 1180 can either remove or down sample the areas of the input image that are outside the area of interest determined at block 1188. This filtering or down sampling reduces the amount of data the densification, segmentation, and body modeling model has to process when performing these tasks, reducing the resources needed to execute the model.

Figure 12:
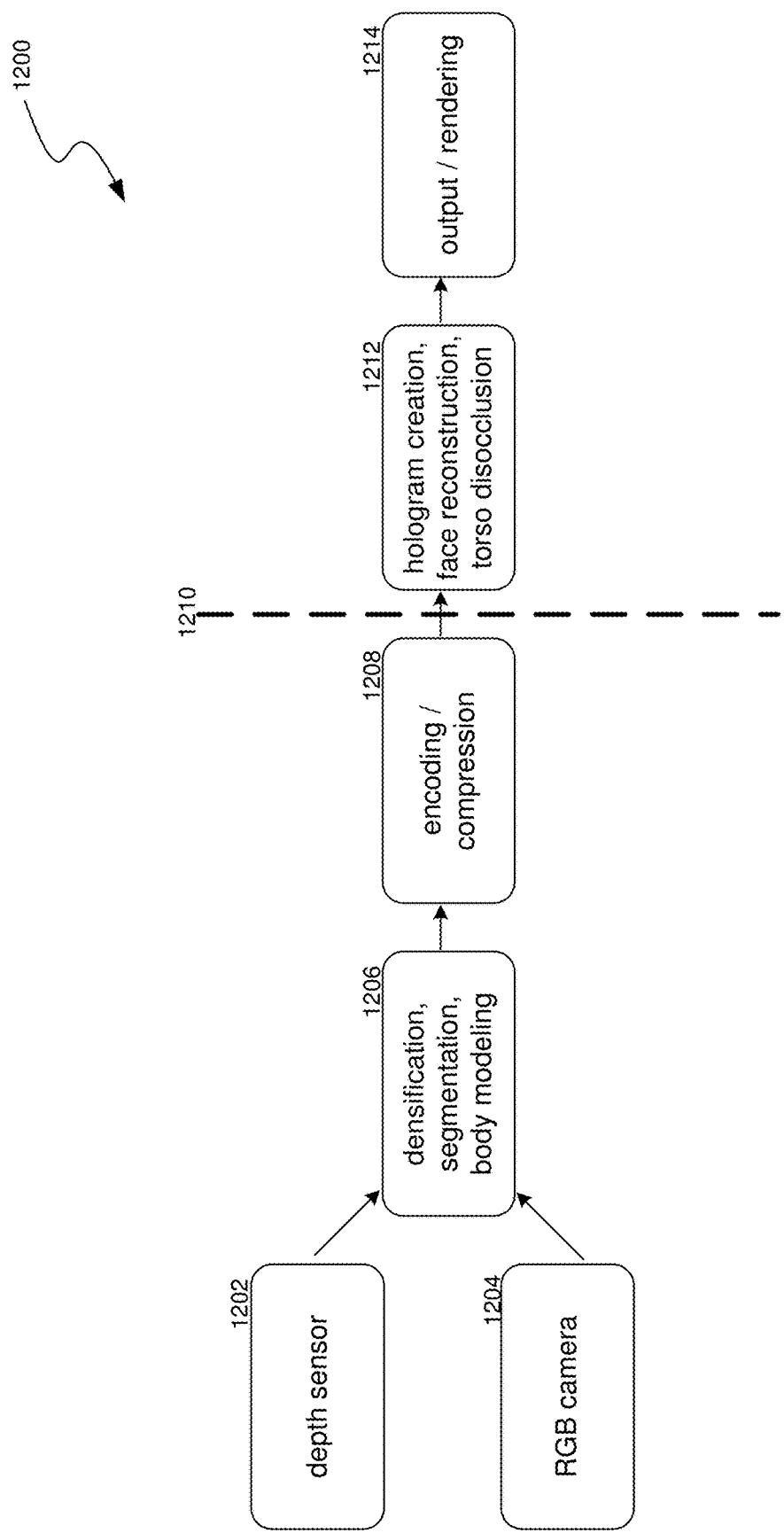
FIG. 12 is a conceptual diagram illustrating an example holographic calling pipeline.

FIG. 12 is a conceptual diagram illustrating an example 1200 holographic calling pipeline. Example 1200 begins with a depth sensor on a sender device capturing a depth image at 1202 and an RGB camera on the sender device capturing a color image at 1204. The depth image and color image are used at the sender device as input to a machine learning model at 1206 that is trained to densify the depth image (creating a depth value for each pixel of the depth image), segment the images to generate segmenting masks, and generate a body model. The color image, densified depth image, masks, and body model are encoded and compressed at 1208 (e.g., using RVL compression) and transmitted across a network (represented as line 1210) to a receiver device. The receiver device, at 1212, decompresses and the received data and uses it to create a holographic representation of the sending user. Also at 1212, the receiver device can perform face reconstruction to remove a XR device from the representation of the sending user and perform torso disocclusion to fill in holes in the representation of the sending user. In some implementations, the processes 1212 are instead performed by the sender device prior to the encoding and compression of the hologram (instead of the image, mask, and body model data) at 1208. At 1214, the receiver can output the generated hologram via a rendering engine, together with audio, synchronized to the hologram, captured at the sender and transmitted to the receiver.

Figure 13:
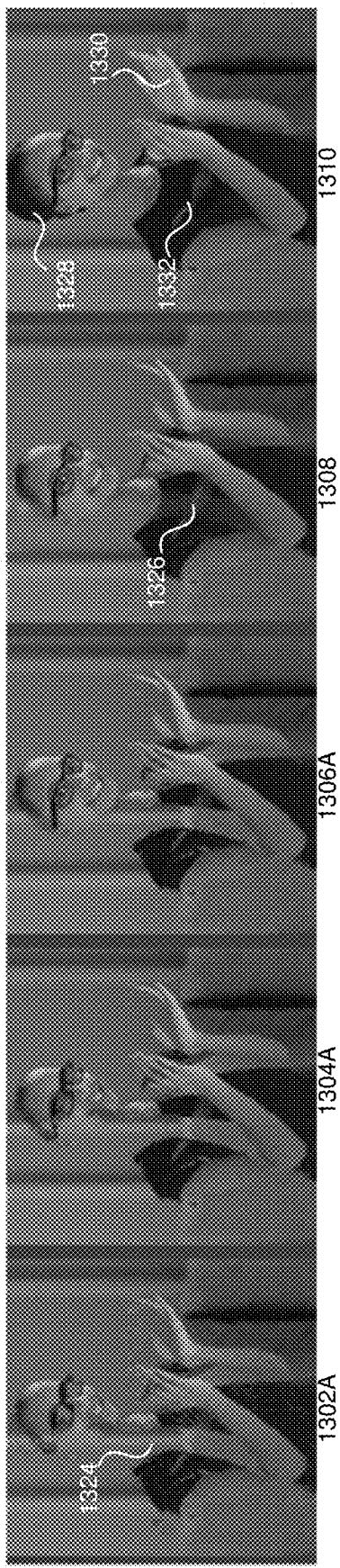
FIG. 13 is a conceptual diagram illustrating examples of data transformation, from raw captured data to a holographic representation of a sending user, through densification, torso disocclusion, facial reconstruction, and model filling.
Figure 13:
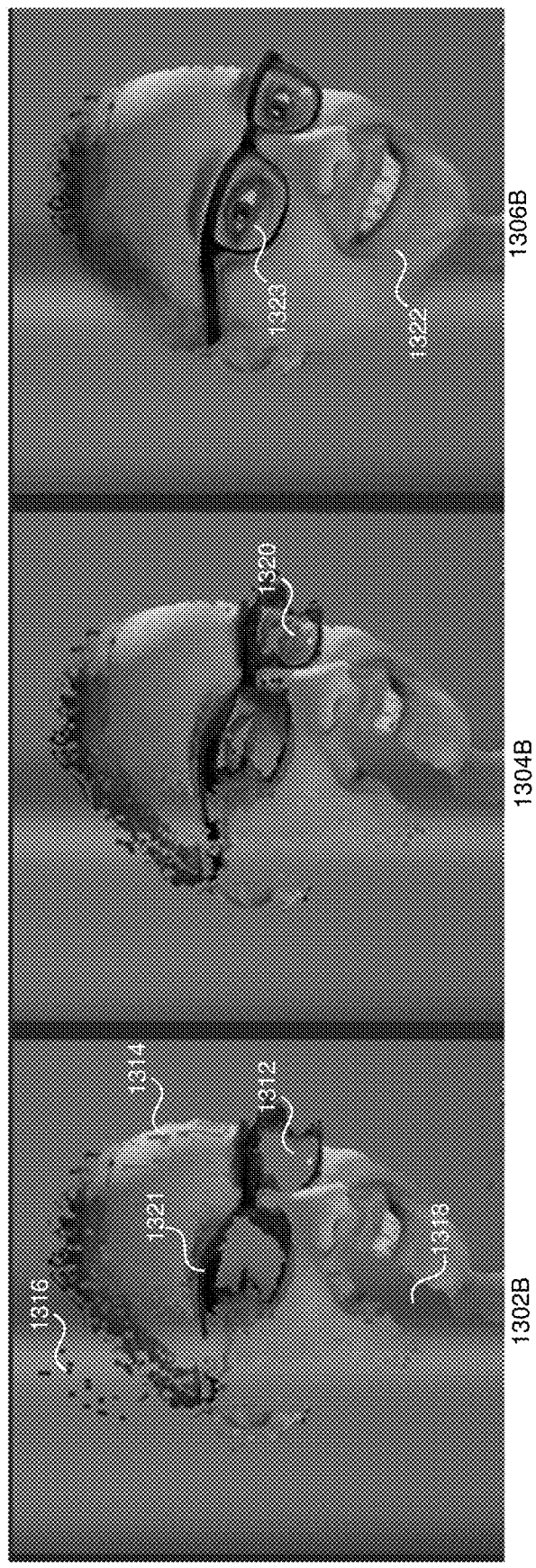

FIG. 13 is a conceptual diagram illustrating examples 1300 of data transformation, from raw captured data to a holographic representation of a sending user, through densification, torso disocclusion, facial reconstruction, and model filling. Image 1302A and (and magnified portion 1302B) illustrates raw captured data, including artifacts 1316 and 1314, missing eye area data 1312 where XR device 1321 lenses block IR depth sensor data, and gaps 1381 and 1324. Image 1304A and (and magnified portion 1304B) illustrates a result of densification of the raw image (as described above in relation to FIGS. 11A-11C. Due to the densification, artifacts 1316 and 1314 have been corrected, depth data 1320 behind the XR device lenses has been filled in, and additional depth data (not shown) has been added). Image 1306A and (and magnified portion 1306B) illustrates a further transformation where facial reconstruction has been performed (as described above in relation to FIGS. 8A and 8B, or 9A and 9B). This facial reconstruction has filled in gap 1318 with data 1322 and has clarified and enhanced the data for the eye area 1323 behind the lenses of the XR device 1321. Image 1308 illustrates a further transformation where torso disocclusion has been performed (as described above in relation to FIG. 10), which has filed in various body gaps, such as gap 1324 with data 1326. Image 1310 illustrates a final transformation to smooth and blend the data (e.g., blending to remove the shadow at 1326 with smooth data 1332) filling in a gap with a generic hand model at 1330, and adding hair 1328 matching a hair color and style determined for the depicted user.

FIG. 14 is a conceptual diagram illustrating an example 1400 of a body model. On the left side, example 1400 illustrates points defined on a body of a user 1402 while these points are again shown on the right side of FIG. 14 without the corresponding person to illustrate the actual components of a body model. These points include eyes 1404 and 1406, nose 1408, ears 1410 (second ear point not shown), chin 1412, neck 1414, clavicles 1416 and 1420, sternum 1418, shoulders 1422 and 1424, elbows 1426 and 1428, stomach 1430, pelvis 1432, hips 1434 and 1436, wrists 1438 and 1446, palms 1440 and 1448, thumb tips 1442 and 1450, finger tips 1444 and 1452, knees 1454 and 1456, ankles 1458 and 1460, and tips of feet 1462 and 1464. In various implementations, more or less points are used in a body model. Some corresponding labels have been put on the points on the right side of FIG. 14, but some have been omitted to maintain clarity. Points connected by lines show that the body model maintains measurements of distances and angles between certain points. Because points 1404-1410 are generally fixed relative to point 1412, they do not need additional connections.

Figure 15:
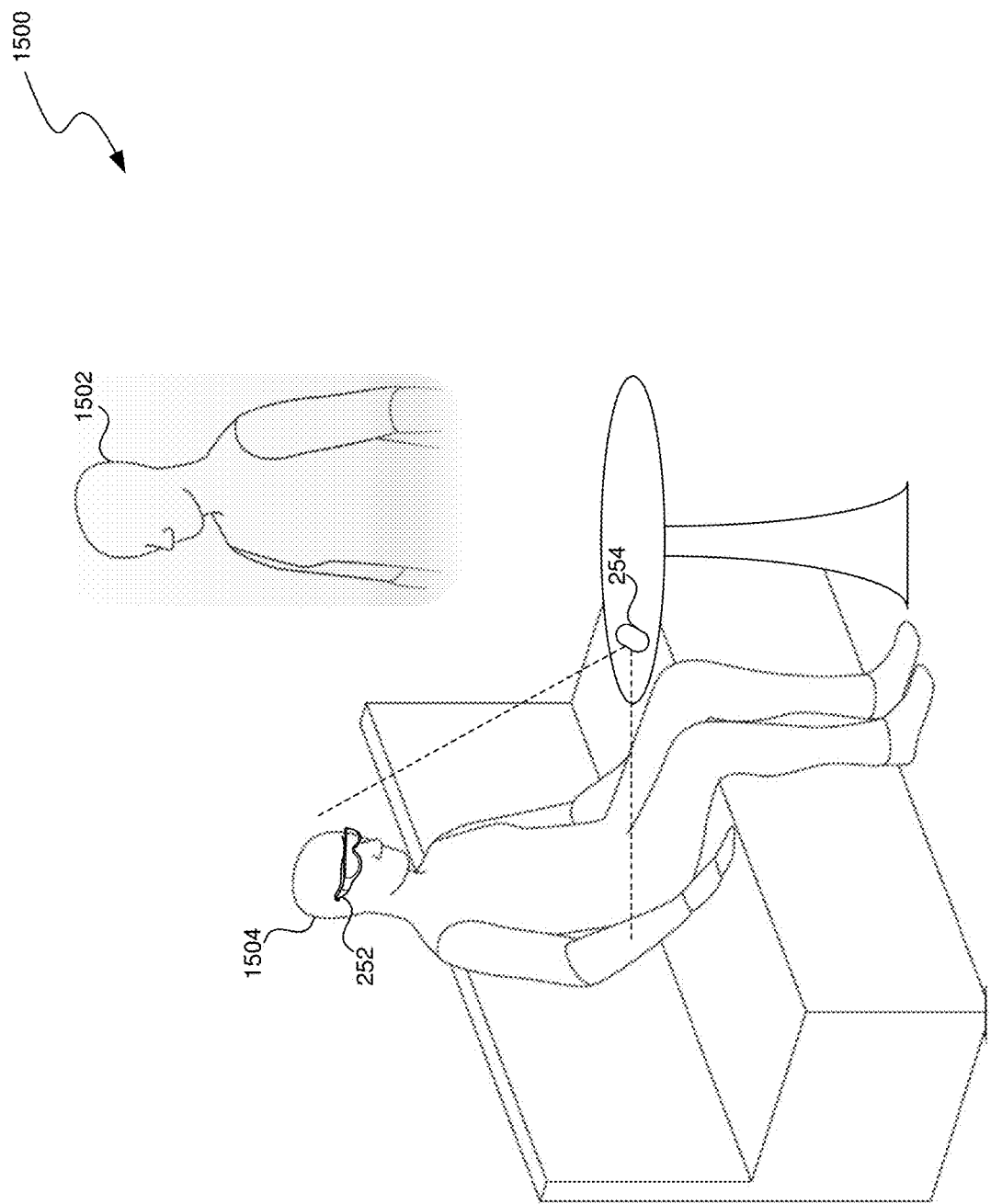
FIG. 15 is a conceptual diagram illustrating an example implementation of a holographic call.

FIG. 15 is a conceptual diagram illustrating an example 1500 implementation of a holographic call. In example 1500, a user 1504 is conducting a holographic call with another user whose representation 1502 appears in the same space as user 1504. In FIG. 15, the representation 1502 is shown with shading to indicate it is a hologram. Representation 1502 is viewable by user 1504 by virtue of the representation 1502 being projected into the user 1504's eyes via the XR device headset 252. Thus, representation 1502 would not be visible to others in the space without an XR device. In the holographic call, color and depth images of user 1504 are captured (as indicated by the broken lines) by device 254 using color and depth cameras. From these, a representation of user 1504 is created and displayed to the recipient user whose representation is 1502 (e.g., using processes 5A/5B or 7A/7B). The XR device headset 252 also captures audio, which is synchronized and transmitted to the recipient user for output simultaneous with the representation of the sending user.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

A "device," as used herein, can include one or more physical components that interoperate, whether or not they are coupled together. For example, an XR device can include the components illustrated in FIG. 2B, even though these components interoperate via a wireless connection.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for conducting a holographic call using a holographic call pipeline, the method comprising:
    establishing a communication channel between a sending device and at least one receiving device;
    capturing, at the sending device, color, depth, and audio data and using the color and depth data to generate one or more color images and one or more depths images;
    generating one or more masks for the one or more color images and one or more depth images;
    applying the one or more masks to the one or more color images and one or more depth images to obtain masked portions of the one or more color images and one or more depth images;
    compressing the masked portions of the one or more color images and one or more depth images; and
    synchronizing and transmitting, over the communication channel, the one or more color images, one or more depth images, and the audio data;
    wherein the receiving device, in response to the transmitting:
        decompresses the compressed portions;
        converts the portions of the one or more depth images into a 3D mesh;
        paints the portions of the one or more color images onto the 3D mesh;
        synchronizes the audio data with the painted 3D mesh;
        performs torso disocclusion on the 3D mesh;
        performs facial reconstruction on the 3D mesh; and
        outputs the painted 3D mesh as a hologram with synchronized audio.

2. The method of claim 1, wherein the communication channel is a real-time communication channel that provides latency guarantees.

3. The method of claim 1, wherein capturing the depth data includes capturing structured light by emitting a pattern of infrared (IR) light, capturing reflections of the IR light, and determining depth data based on how the pattern of IR light is distorted and/or using time-of-flight readings for parts of the pattern of IR light.

4. The method of claim 1, wherein the one or more color images include multiple color images captured from multiple cameras at different resolutions, and wherein the generating one or more masks for the one or more color images and one or more depth images is performed based on the color images captured at the lower resolution.

5. The method of claim 1, wherein the one or more depth images do not have a depth value for each pixel, and wherein the method further comprises:
performing a densification procedure on the one or more depth images to assign a depth value to each pixel of the one or more depth images;
wherein the densification procedure comprises applying a machine learning model trained, to densify depth image, using synthetic images of people, the synthetic images of people generated with specified depth data for each pixel.

6. The method of claim 1, wherein generating the one or more masks comprises:
identifying segments for the one or more color images and/or the one or more depth image, the segments comprising at least foreground and background distinctions;
wherein the identifying the segments comprises applying a machine learning model trained, to segment images, using synthetic images of people, the synthetic images of people generated with specified labeled segments.

7. The method of claim 1, wherein the one or more depth images do not have a depth value for each pixel, and wherein the method further comprises:
performing a densification procedure on the one or more depth images to assign a depth value to each pixel of the one or more depth images and identify segments for the one or more color images and/or the one or more depth image, the segments comprising at least foreground and background distinctions;
wherein the densification procedure comprises applying a machine learning model trained, to densify depth image and segment images, using synthetic images of people, the synthetic images of people generated with specified depth data for each pixel and labeled segments.

8. The method of claim 1, wherein at least part of the compression is performed using an RVL compression algorithm.

9. The method of claim 1, wherein the torso disocclusion on the 3D mesh includes:
generating an existing model of a body of a sending user based on one or more previously captured images of the sending user;
identifying one or more holes in the 3D mesh corresponding to occlusions between a depth sensor and the sending user; and
filling in the one or more holes in the 3D mesh with corresponding portions from the existing model.

10. The method of claim 1, wherein the facial reconstruction on the 3D mesh includes:
encoding at least a facial portion, depicting a sending user wearing an XR headset, of at least one of the one or more color images;
applying a geometry branch of a machine learning model to the encoded facial portion to produce a predicted geometry of the sending user without the XR headset;
applying a texture branch of a machine learning model to the encoded facial portion to produce a predicted texture of the sending user without the XR headset; and
skinning the predicted texture onto the predicted geometry.

11. The method of claim 1, wherein the facial reconstruction on the 3D mesh includes:
performing a pre-scan of a sending user, while not wearing an XR headset, to generate multiple expression meshes for the sending user;
determining a head pose and facial expression for the sending user;
selecting multiple of the expression meshes that match the determined facial expression and adjusting the selected multiple expression meshes to conform to the head pose;
combining the multiple selected expression meshes; and
applying depth and color blending on the combined expression mesh with at least the one or more color images.

12. A computer-readable storage medium storing instructions that, when executed by a computing system, cause the computing system to perform a process for conducting a holographic call using a holographic call pipeline, the process comprising:
capturing, at a sending device, color, depth, and audio data and using the color and depth data to generate one or more color images and one or more depths images;
generating one or more masks for the one or more color images and one or more depth images;
applying the one or more masks to the one or more color images and one or more depth images to obtain masked portions of the one or more color images and one or more depth images;
compressing the masked portions of the one or more color images and one or more depth images; and
transmitting, over a communication channel, the compressed portions and the audio data;
wherein a receiving device, in response to the transmitting:
decompresses the compressed portions;
converts the portions of the one or more depth images into a 3D mesh;
paints the portions of the one or more color images onto the 3D mesh; and
outputs the painted 3D mesh as a hologram with synchronized audio.

13. The computer-readable storage medium of claim 12, wherein capturing the depth data includes capturing structured light by emitting a pattern of infrared (IR) light, capturing reflections of the IR light, and determining depth data based on how the pattern of IR light is distorted and/or using time-of-flight readings for parts of the pattern of IR light.

14. The computer-readable storage medium of claim 12, wherein the one or more depth images do not have a depth value for each pixel, and wherein the process further comprises:
performing a densification procedure on the one or more depth images to assign a depth value to each pixel of the one or more depth images and identify segments for the one or more color images and/or the one or more depth image, the segments comprising at least foreground and background distinctions;
wherein the densification procedure comprises applying a machine learning model trained, to densify depth image and segment images, using synthetic images of people, the synthetic images of people generated with specified depth data for each pixel and labeled segments.

15. The computer-readable storage medium of claim 12, wherein the receiving device, in response to the transmitting, further performs torso disocclusion on the 3D mesh, including:

generating an existing model of a body of a sending user based on one or more previously captured images of the sending user;

identifying one or more holes in the 3D mesh corresponding to occlusions between a depth sensor and the sending user; and filling in the one or more holes in the 3D mesh with corresponding portions from the existing model.

16. The computer-readable storage medium of claim 12, wherein the receiving device, in response to the transmitting, further performs facial reconstruction on the 3D mesh, including:

performing a pre-scan of a sending user, while not wearing an XR headset, to generate multiple expression meshes for the sending user;

determining a head pose and facial expression for the sending user;

selecting multiple of the expression meshes that match the determined facial expression and adjusting the selected multiple expression meshes to conform to the head pose;

combining the multiple selected expression meshes; and applying depth and color blending on the combined expression mesh with at least the one or more color images.

17. A computing system for conducting a holographic call using a holographic call pipeline, the computing system comprising:

one or more processors; and one or more memories storing instructions that, when executed by the one or more processors, cause the computing system to perform a process comprising:

capturing, at a sending device, color, depth, and audio data and using the color and depth data to generate one or more color images and one or more depths images;

generating one or more masks for the one or more color images and one or more depth images;

applying the one or more masks to the one or more color images and one or more depth images to obtain masked portions of the one or more color images and one or more depth images;

transmitting versions of the masked portions and the audio data;

wherein the receiving device, in response to the transmitting:

converts the portions of the one or more depth images and the portions of the one or more color images into a painted 3D mesh; and outputs the painted 3D mesh as a hologram, synchronized with the audio data.

18. The computing system of claim 17, wherein the one or more depth images do not have a depth value for each pixel, and wherein the process further comprises:

performing a densification procedure on the one or more depth images to assign a depth value to each pixel of the one or more depth images and identify segments for the one or more color images and/or the one or more depth image, the segments comprising at least foreground and background distinctions;

wherein the densification procedure comprises applying a machine learning model trained, to densify depth image and segment images, using synthetic images of people, the synthetic images of people generated with specified depth data for each pixel and labeled segments.

19. The computing system of claim 17, wherein the receiving device, in response to the transmitting, further performs torso disocclusion on the 3D mesh, including:

generating an existing model of a body of a sending user based on one or more previously captured images of the sending user;

identifying one or more holes in the 3D mesh corresponding to occlusions between a depth sensor and the sending user; and filling in the one or more holes in the 3D mesh with corresponding portions from the existing model.

20. The computing system of claim 17, wherein the receiving device, in response to the transmitting, further performs facial reconstruction on the 3D mesh, including:

encoding at least a facial portion, depicting a sending user wearing an XR headset, of at least one of the one or more color images;

applying a geometry branch of a machine learning model to the encoded facial portion to produce a predicted geometry of the sending user without the XR headset;

applying a texture branch of a machine learning model to the encoded facial portion to produce a predicted texture of the sending user without the XR headset; and skinning the predicted texture onto the predicted geometry.

* * * * *